US007221996B2

(12) United States Patent
Benson

(10) Patent No.: US 7,221,996 B2
(45) **Date of Patent: *May 22, 2007**

(54) SYSTEM AND METHOD FOR COMBINED MAILING OF A PLURALITY OF DIVERSE PUBLICATIONS

(76) Inventor: Donald B. Benson, 6451 Melville Dr., Oakland, CA (US) 94611-1730

( * ) Notice: Subject to any disclaimer, the term of this patent is extended or adjusted under 35 U.S.C. 154(b) by 141 days.

This patent is subject to a terminal disclaimer.

(21) Appl. No.: 10/991,677

(22) Filed: Nov. 18, 2004

(65) Prior Publication Data

US 2005/0197975 A1 Sep. 8, 2005

Related U.S. Application Data

(63) Continuation of application No. 09/641,095, filed on Aug. 17, 2000, now Pat. No. 7,133,851.

(51) Int. Cl.
*G06F 7/00* (2006.01)

(52) U.S. Cl. ...................... 700/221; 700/222; 700/223; 700/224; 700/225; 700/227; 270/1.02; 270/1.03; 270/52.01

(58) Field of Classification Search ................ 700/220, 700/221, 222, 223, 224, 225, 226, 227; 270/1.01, 270/1.02, 1.03, 52.01, 52.02
See application file for complete search history.

(56) References Cited

U.S. PATENT DOCUMENTS 4,989,852 A * 2/1991 Gunther, Jr. ................. 270/56
5,142,482 A * 8/1992 Sansone ..................... 700/221
5,264,665 A * 11/1993 Delfer, III ............... 177/25.15
5,287,976 A * 2/1994 Mayer et al. ............... 209/547
5,377,120 A * 12/1994 Humes et al. .............. 700/224
6,167,326 A * 12/2000 Graushar et al. ........... 700/223
6,240,334 B1 * 5/2001 Duke et al. ................. 700/221
6,347,260 B1 * 2/2002 Graushar et al. ........... 700/223
6,598,748 B2 * 7/2003 Mileaf et al. .............. 209/542
6,662,079 B2 * 12/2003 Bodie ......................... 700/227
7,133,851 B1 * 11/2006 Benson ....................... 705/410

* cited by examiner

*Primary Examiner*—Khoi H. Tran
(74) *Attorney, Agent, or Firm*—Michael A. Molano; Mayer, Brown, Rowe & Maw LLP

(57) ABSTRACT

A system for combined mailing of a plurality of diverse publications to a plurality of recipients at an optimized mail rate. The system includes a bindery for binding a plurality of the signatures where the bindery binding the plurality of signatures creates a plurality of first publications and a plurality of second publications. Each of the plurality of first and second publications are in a unique order, where the unique order identifies each of the plurality of first publications and each of the plurality of second publications with each of the plurality of recipients. A co-mailer is part of the system for combining the plurality of first publications with the plurality of second publications to form a plurality of diverse publications. The co-mailer merges the plurality of first and second publications in the unique order to send the plurality of diverse publications to the plurality of recipients at the optimized mail rate.

19 Claims, 14 Drawing Sheets

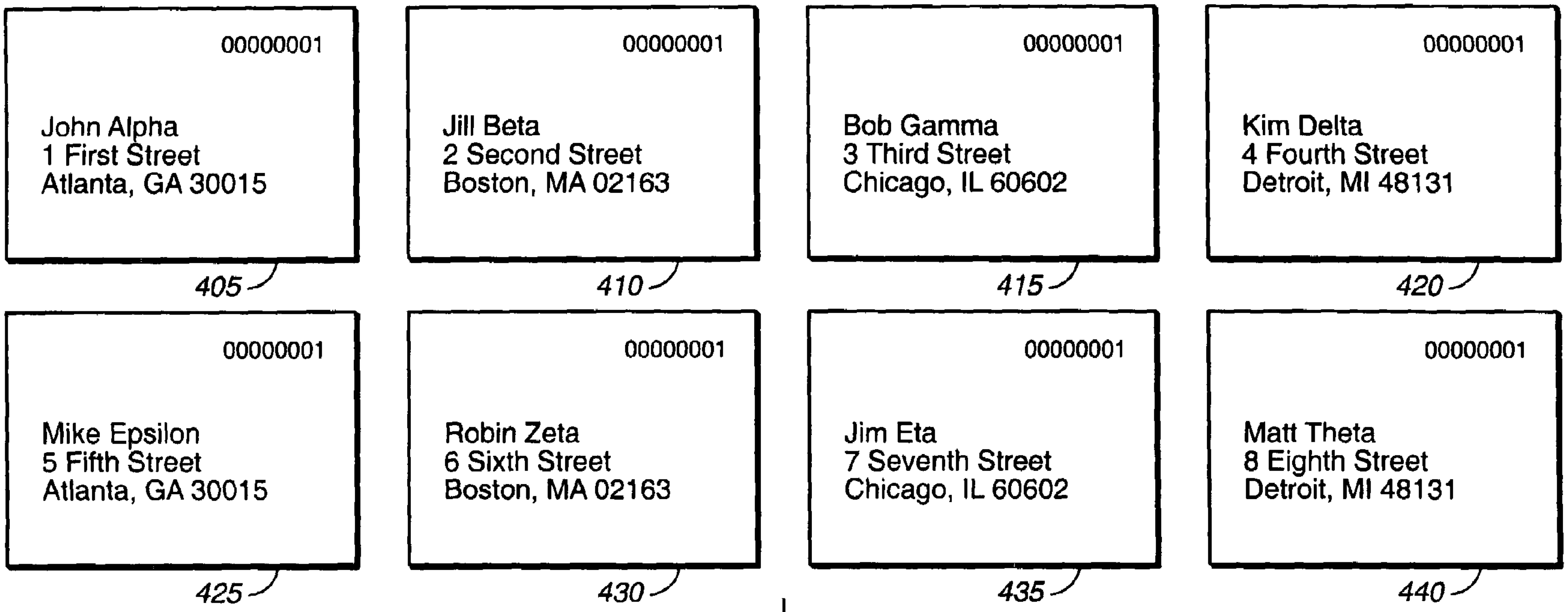

RECORD LIST

| Record # | Name | Street # | Street | City | Zip Code | Customer Info. | CR | Walk Seq. | Title | SC | OEL | Demo |
|---|---|---|---|---|---|---|---|---|---|---|---|---|
| 1. | Alpha, John | 1 | First Street | Atlanta | 30015 | 00000001 | 001 | WS20 | A | 0000001 | X x Y x H or V | M |
| 2. | Beta, Jill | 2 | Second Street | Boston | 02163 | 00000003 | 002 | WS10 | A | 0000001 | X x Y x H or V | F |
| 3. | Gamma, Bob | 3 | Third Street | Chicago | 60602 | 00000005 | 003 | WS21 | A | 0000001 | X x Y x H or V | M |
| 4. | Delta, Kim | 4 | Fourth Street | Detroit | 48131 | 00000007 | 004 | WS136 | A | 0000001 | X x Y x H or V | F |
| 5. | Epsilon, Mike | 5 | Fifth Street | Atlanta | 30015 | 00000009 | 001 | WS100 | A | 0000001 | X x Y x H or V | M |
| 6. | Zeta, Robin | 6 | Sixth Street | Boston | 02163 | 00000011 | 002 | WS72 | A | 0000001 | X x Y x H or V | F |
| 7. | Eta, Jim | 7 | Seventh Street | Chicago | 60602 | 00000013 | 003 | WS86 | A | 0000001 | X x Y x H or V | M |
| 8. | Theta, Matt | 8 | Eighth Street | Detroit | 48131 | 00000015 | 005 | WS62 | A | 0000001 | X x Y x H or V | M |

445

TO FIG. 5

FIG._4

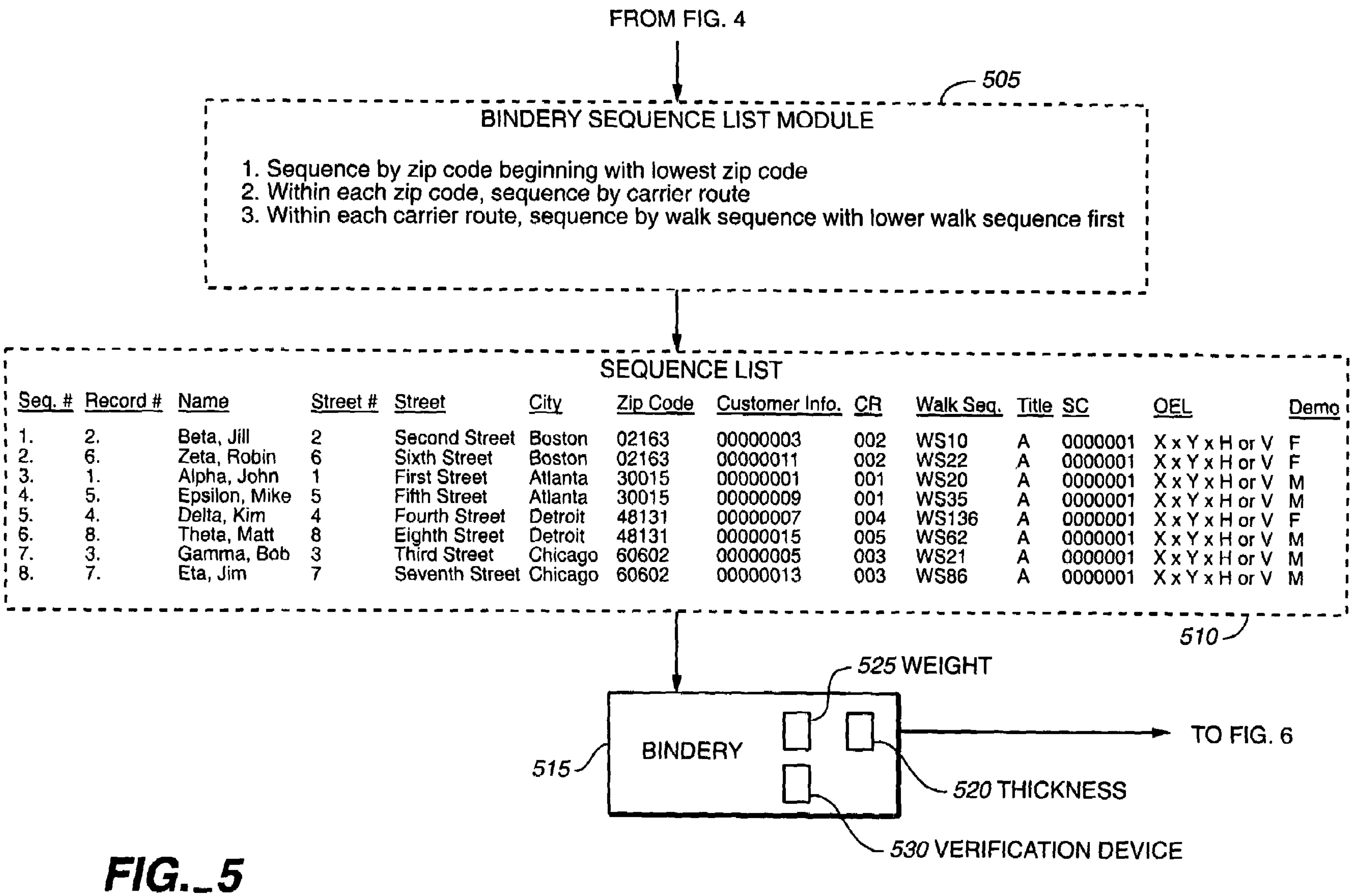

| Seq. # | Record # | Name | Street # | Street | City | Zip Code | Customer Info. | CR | Walk Seq. | Title | SC | OEL | Demo |
|---|---|---|---|---|---|---|---|---|---|---|---|---|---|
| 1. | 2. | Beta, Jill | 2 | Second Street | Boston | 02163 | 00000003 | 002 | WS10 | A | 0000001 | X x Y x H or V | F |
| 2. | 6. | Zeta, Robin | 6 | Sixth Street | Boston | 02163 | 00000011 | 002 | WS22 | A | 0000001 | X x Y x H or V | F |
| 3. | 1. | Alpha, John | 1 | First Street | Atlanta | 30015 | 00000001 | 001 | WS20 | A | 0000001 | X x Y x H or V | M |
| 4. | 5. | Epsilon, Mike | 5 | Fifth Street | Atlanta | 30015 | 00000009 | 001 | WS35 | A | 0000001 | X x Y x H or V | M |
| 5. | 4. | Delta, Kim | 4 | Fourth Street | Detroit | 48131 | 00000007 | 004 | WS136 | A | 0000001 | X x Y x H or V | F |
| 6. | 8. | Theta, Matt | 8 | Eighth Street | Detroit | 48131 | 00000015 | 005 | WS62 | A | 0000001 | X x Y x H or V | M |
| 7. | 3. | Gamma, Bob | 3 | Third Street | Chicago | 60602 | 00000005 | 003 | WS21 | A | 0000001 | X x Y x H or V | M |
| 8. | 7. | Eta, Jim | 7 | Seventh Street | Chicago | 60602 | 00000013 | 003 | WS86 | A | 0000001 | X x Y x H or V | M |

FIG._5

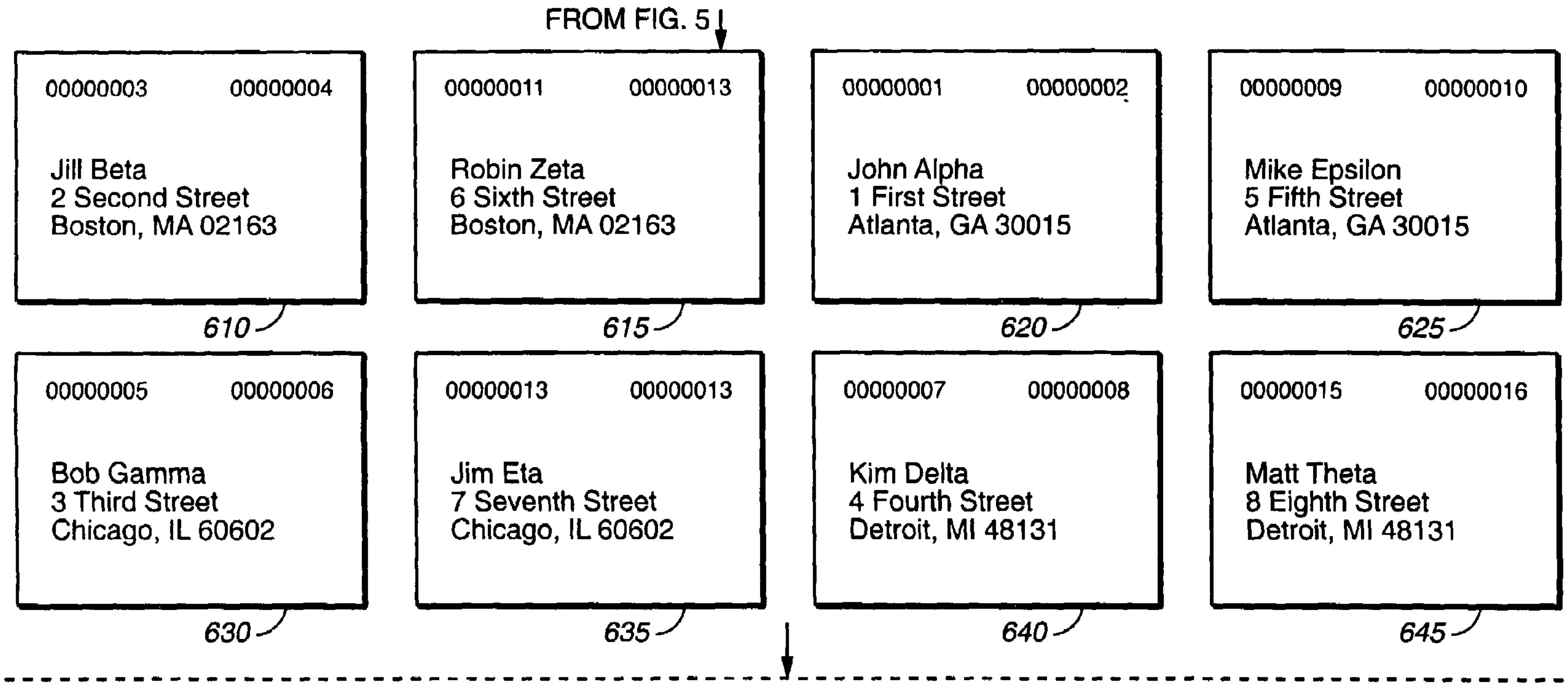

VERIFIED SEQUENCE LIST A

| Seq. # | Rec # | Name | Street # | Street | City | Zip Code | Cl. | CR | Walk Seq. | Title | SC | OEL | Wt. | Thick | Bundle | Demo |
|---|---|---|---|---|---|---|---|---|---|---|---|---|---|---|---|---|
| 1. | 2. | Beta, Jill | 2 | Second Street | Boston | 02163 | 00000003 | 002 | WS10 | A | 0000001 | XxYxHxv | 1.5 | .19 | 1 | F |
| 2. | 6. | Zeta, Robin | 6 | Sixth Street | Boston | 02163 | 00000011 | 002 | WS22 | A | 0000001 | XxYxHxv | 1.5 | .19 | 1 | F |
| 3. | 1. | Alpha, John | 1 | First Street | Atlanta | 30015 | 00000001 | 001 | WS20 | A | 0000001 | XxYxHxv | 1.5 | .19 | 1 | M |
| 4. | 5. | Epsilon, Mike | 5 | Fifth Street | Atlanta | 30015 | 00000009 | 001 | WS35 | A | 0000001 | XxYxHxv | 1.5 | .19 | 1 | M |
| BINDERY ERROR FOR SEQUENCE NO. 5 | | | | | | | | | | | | | | | | |
| 5. | 8. | Theta, Matt | 8 | Eighth Street | Detroit | 48131 | 00000015 | 005 | WS62 | A | 0000001 | XxYxHxv | 2.0 | .25 | 1 | M |
| 6. | 3. | Gamma, Bob | 3 | Third Street | Chicago | 60602 | 00000005 | 003 | WS21 | A | 0000001 | XxYxHxv | 1.5 | .19 | 1 | M |
| 7. | 7. | Eta, Jim | 7 | Seventh Street | Chicago | 60602 | 00000013 | 003 | WS86 | A | 0000001 | XxYxHxv | 1.5 | .19 | 1 | M |
| **MIXED MAIL** | | | | | | | | | | | | | | | | |
| 1. | 4. | Delta, Kim | 4 | Fourth Street | Detroit | 48131 | 00000007 | 004 | WS136 | A | 0000001 | XxYxHxv | 1.5 | .19 | 1 | F |

605

FIG._6

FROM FIG. 6

VERIFIED SEQUENCE LIST A

| Seq. # | Rec # | Name | Street # | Street | City | Zip Code | Cl. | CR | Walk Seq. | Title | SC | OEL | Wt. | Thick | Bundle | Demo |
|---|---|---|---|---|---|---|---|---|---|---|---|---|---|---|---|---|
| 1. | 2. | Beta, Jill | 2 | Second Street | Boston | 02163 | 00000003 | 002 | WS10 | A | 0000001 | XxYxHorV | 1.5 | .19 | 1 | F |
| 2. | 6. | Zeta, Robin | 6 | Sixth Street | Boston | 02163 | 00000011 | 002 | WS22 | A | 0000001 | XxYxHorV | 1.5 | .19 | 1 | F |
| 3. | 1. | Alpha, John | 1 | First Street | Atlanta | 30015 | 00000001 | 001 | WS20 | A | 0000001 | XxYxHorV | 1.5 | .19 | 1 | M |
| 4. | 5. | Epsilon, Mike | 5 | Fifth Street | Atlanta | 30015 | 00000009 | 001 | WS35 | A | 0000001 | XxYxHorV | 1.5 | .19 | 1 | M |
| BINDERY ERROR FOR SEQUENCE NO. 5 | | | | | | | | | | | | | | | | |
| 5. | 8. | Theta, Matt | 8 | Eighth Street | Detroit | 48131 | 00000015 | 005 | WS62 | A | 0000001 | XxYxHorV | 2.0 | .25 | 1 | M |
| 6. | 3. | Gamma, Bob | 3 | Third Street | Chicago | 60602 | 00000005 | 003 | WS21 | A | 0000001 | XxYxHorV | 1.5 | .19 | 1 | M |
| 7. | 7. | Eta, Jim | 7 | Seventh Street | Chicago | 60602 | 00000013 | 003 | WS86 | A | 0000001 | XxYxHorV | 1.5 | .19 | 1 | M |
| **MIXED MAIL** | | | | | | | | | | | | | | | | |
| 1. | 4. | Delta, Kim | 4 | Fourth Street | Detroit | 48131 | 00000007 | 004 | WS136 | A | 0000001 | XxYxHorV | 1.5 | .19 | 1 | F |

605

VERIFIED SEQUENCE LIST B

| Seq. # | Rec # | Name | Street # | Street | City | Zip Code | Cl. | CR | Walk Seq. | Title | SC | OEL | Wt. | Thick | Bundle | Demo |
|---|---|---|---|---|---|---|---|---|---|---|---|---|---|---|---|---|
| 1. | 6. | Xi, Pat | 13 | Fourteenth St. | Boston | 02163 | 00000027 | 002 | WS64 | B | 0000002 | X'xY'xHorV | 2.0 | .19 | 1 | F |
| 2. | 4. | Mu, Joe | 13 | Twelfth St. | Boston | 02163 | 00000023 | 002 | WS45 | B | 0000002 | X'xY'xHorV | 2.0 | .19 | 1 | M |
| 3. | 5. | Nu, Barb | 13 | Thirteenth St. | Atlanta | 30015 | 00000025 | 003 | WS10 | B | 0000002 | X'xY'xHorV | 2.0 | .19 | 1 | F |
| 4. | 1. | Iota, Rob | 9 | Ninth St. | Atlanta | 30015 | 00000017 | 001 | WS53 | B | 0000002 | X'xY'xHorV | 2.0 | .19 | 1 | M |
| 5. | 7. | Omicron, Deb | 15 | Fifteenth St. | Detroit | 48131 | 00000029 | 004 | WS45 | B | 0000002 | X'xY'xHorV | 2.0 | .19 | 1 | F |
| 6. | 8. | Pi, Gayle | 16 | Sixteenth St. | Detroit | 48131 | 00000031 | 004 | WS74 | B | 0000002 | X'xY'xHorV | 2.0 | .19 | 1 | F |
| 7. | 2. | Kappa, Mark | 10 | Tenth St. | Chicago | 60602 | 00000019 | 003 | WS97 | B | 0000002 | X'xY'xHorV | 2.0 | .19 | 1 | M |
| 8. | 3. | Lambda, Paul | 11 | Eleventh St. | Chicago | 60602 | 00000021 | 004 | WS6 | B | 0000002 | X'xY'xHorV | 2.0 | .19 | 1 | M |

710

TO FIG. 8

FIG._7

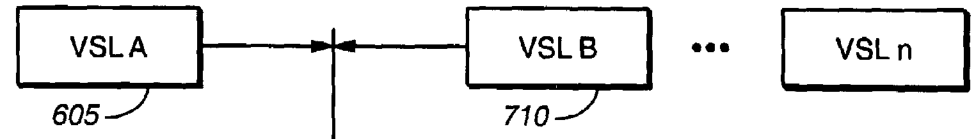

MEGED VERIFIED SEQUENCE LIST

| Seq. # | Rec # | Name | Street # | Street | City | Zip Code | Cl. | CR | Walk Seq. | Title | SC | OEL | Wt. | Thick | Bundle | Demo |
|---|---|---|---|---|---|---|---|---|---|---|---|---|---|---|---|---|
| 1. | 2. | Beta, Jill | 2 | Second Street | Boston | 02163 | 00000003 | 002 | WS10 | A | 0000001 | XxYxHorV | 1.5 | .19 | 1 | F |
| 2. | 6. | Zeta, Robin | 6 | Sixth Street | Boston | 02163 | 00000011 | 002 | WS22 | A | 0000001 | XxYxHorV | 1.5 | .19 | 1 | F |
| 3. | 4. | Mu, Joe | 13 | Twelfth St. | Boston | 02163 | 00000023 | 002 | WS45 | B | 0000002 | X'xY'xHorV | 2.0 | .19 | 1 | M |
| 4. | 6. | Xi, Pat | 13 | Fourteen St. | Boston | 02163 | 00000027 | 002 | WS64 | B | 0000002 | X'xY'xHorV | 2.0 | .19 | 1 | F |
| 5. | 1. | Alpha, John | 1 | First Street | Atlanta | 30015 | 00000001 | 001 | WS20 | A | 0000001 | XxYxHorV | 1.5 | .19 | 1 | M |
| 6. | 5. | Epsilon, Mike | 5 | Fifth Street | Atlanta | 30015 | 00000009 | 001 | WS35 | A | 0000001 | XxYxHorV | 1.5 | .19 | 1 | M |
| 7. | 1. | Iota, Rob | 9 | Ninth Street | Atlanta | 30015 | 00000017 | 001 | WS53 | B | 0000002 | X'xY'xHorV | 2.0 | .19 | 1 | M |
| 8. | 5. | Nu, Barb | 13 | Thirteenth St. | Atlanta | 30015 | 00000025 | 003 | WS10 | B | 0000002 | X'xY'xHorV | 2.0 | .19 | 1 | F |
| 9. | 7. | Omicron, Deb | 15 | Fifteenth St. | Detroit | 48131 | 00000029 | 004 | WS45 | B | 0000002 | X'xY'xHorV | 2.0 | .19 | 1 | F |
| 10. | 8. | Pi, Gayle | 16 | Sixteenth St. | Detroit | 48131 | 00000031 | 004 | WS74 | B | 0000002 | X'xY'xHorV | 2.0 | .19 | 1 | F |
| 11. | 8. | Theta, Matt | 8 | Eighth Street | Detroit | 48131 | 00000015 | 005 | WS62 | A | 0000001 | XxYxHorV | 2.0 | .25 | 1 | M |
| 13. | 3. | Gamma, Bob | 3 | Third Street | Chicago | 60602 | 00000005 | 003 | WS21 | A | 0000001 | XxYxHorV | 1.5 | .19 | 1 | M |
| 13. | 7. | Eta, Jim | 7 | Seventh Street | Chicago | 60602 | 00000013 | 003 | WS86 | A | 0000001 | XxYxHorV | 1.5 | .19 | 1 | M |
| 13. | 2. | Kappa, Mark | 10 | Tenth Street | Chicago | 60602 | 00000019 | 003 | WS97 | B | 0000002 | X'xY'xHorV | 2.0 | .19 | 1 | M |
| 15. | 3. | Lambda, Paul | 11 | Eleventh St. | Chicago | 60602 | 00000021 | 004 | WS6 | B | 0000002 | X'xY'xHorV | 2.0 | .19 | 1 | M |
| .... | | | | | | | | | | | | | | | | |
| **MIXED MAIL** | | | | | | | | | | | | | | | | |
| 1. | 4. | Delta, Kim | 4 | Fourth Street | Detroit | 48131 | 00000007 | 004 | WS136 | A | 0000001 | XxYxHorV | 1.5 | .19 | 1 | F |

805

TO FIG. 9

*FIG._8*

FROM FIG. 9

OPTIMIZED MERGED VERIFIED SEQUENCE LIST

| Seq. # | Rec # | Name | Street # | Street | City | Zip Code | Cl. | CR | WS | Title | SC | OEL | Wt. | Thick | Bundle | Demo | MR |
|---|---|---|---|---|---|---|---|---|---|---|---|---|---|---|---|---|---|
| 1. | 2. | Beta, Jill | 2 | Second Street | Boston | 02163 | 00000003 | 002 | WS10 | A | 0000001 | XxYxHorV | 1.5 | .19 | 1 | F | ECR |
| 2. | 6. | Zeta, Robin | 6 | Sixth Street | Boston | 02163 | 00000011 | 002 | WS22 | A | 0000001 | XxYxHorV | 1.5 | .19 | 1 | F | ECR |
| 3. | 4. | Mu, Joe | 13 | Twelfth St. | Boston | 02163 | 00000023 | 002 | WS45 | B | 0000002 | X'xY'xHorV | 2.0 | .19 | 1 | M | ECR |
| 4. | 6. | Xi, Pat | 13 | Fourteen St. | Boston | 02163 | 00000027 | 002 | WS64 | B | 0000002 | X'xY'xHorV | 2.0 | .19 | 1 | F | 5D |
| 5. | 1. | Alpha, John | 1 | First Street | Atlanta | 30015 | 00000001 | 001 | WS20 | A | 0000001 | XxYxHorV | 1.5 | .19 | 1 | M | 3D |
| 6. | 5. | Epsilon, Mike | 5 | Fifth Street | Atlanta | 30015 | 00000009 | 001 | WS35 | A | 0000001 | XxYxHorV | 1.5 | .19 | 1 | M | ECR |
| 7. | 1. | Iota, Rob | 9 | Ninth Street | Atlanta | 30015 | 00000017 | 001 | WS53 | B | 0000002 | X'xY'xHorV | 2.0 | .19 | 1 | M | ECR |
| 8. | 5. | Nu, Barb | 13 | Thirteenth St. | Atlanta | 30015 | 00000025 | 003 | WS10 | B | 0000002 | X'xY'xHorV | 2.0 | .19 | 1 | F | 5D |
| 9. | 7. | Omicron, Deb | 15 | Fifteenth St. | Detroit | 48131 | 00000029 | 004 | WS45 | B | 0000002 | X'xY'xHorV | 2.0 | .19 | 1 | F | 5D |
| 10. | 8. | Pi, Gayle | 16 | Sixteenth St. | Detroit | 48131 | 00000031 | 004 | WS74 | B | 0000002 | X'xY'xHorV | 2.0 | .19 | 1 | F | 5D |
| 11. | 8. | Theta, Matt | 8 | Eighth Street | Detroit | 48131 | 00000015 | 005 | WS62 | A | 0000001 | XxYxHorV | 2.0 | .25 | 1 | M | 5D |
| 13. | 3. | Gamma, Bob | 3 | Third Street | Chicago | 60602 | 00000005 | 003 | WS21 | A | 0000001 | XxYxHorV | 1.5 | .19 | 1 | M | 3D |
| 13. | 7. | Eta, Jim | 7 | Seventh Street | Chicago | 60602 | 00000013 | 003 | WS86 | A | 0000001 | XxYxHorV | 1.5 | .19 | 1 | M | ECR |
| 13. | 2. | Kappa, Mark | 10 | Tenth Street | Chicago | 60602 | 00000019 | 003 | WS97 | B | 0000002 | X'xY'xHorV | 2.0 | .19 | 1 | M | ECR |
| 15. | 3. | Lambda, Paul | 11 | Eleventh St. | Chicago | 60602 | 00000021 | 004 | WS6 | B | 0000002 | X'xY'xHorV | 2.0 | .19 | 1 | M | ECR |
| .... | | | | | | | | | | | | | | | | | |
| **MIXED MAIL** | | | | | | | | | | | | | | | | | |
| 1. | 4. | Delta, Kim | 4 | Fourth Street | Detroit | 48131 | 00000007 | 004 | WS136 | A | 0000001 | XxYxHorV | 1.5 | .19 | 1 | F | REG |

1005

Co-Mailer → Sortation Device → Bundling Device → Post Office

FIG._10

SYSTEM AND METHOD FOR COMBINED MAILING OF A PLURALITY OF DIVERSE PUBLICATIONS

This application is a continuation of U.S. patent application Ser. No. 09/641,095, filed Aug. 17, 2000 now U.S. Pat. No. 7,133,851, hereby incorporated by reference herein.

BACKGROUND OF THE INVENTION

1. Field of the Invention

The present invention relates generally to delivery systems and, more particularly, to a system and method for combined mailing of diverse publications in a unique order.

2. Description of the Related Art

Numerous systems exist for binding and combined mailing of a variety of titles (e.g., magazines, catalogs, books, periodicals, and the like). In the past, two typical systems have been generally used to minimize postage rates paid to the United States Postal Service (USPS) in order to mail the titles. That is, volume discounts may be utilized by using two conventional systems: (1) a bindery and presort system that binds the titles and sorts a list of addresses for a single title (for example, titles may be magazines such as *Time*®, *Sports Illustrated*®, etc.) to the finest extent possible to take advantage of reductions in mail rates provided by the USPS for sorting various titles; and (2) a combined mailing and presort system generally known as "co-mailing" which is the merging of multiple titles to again take advantage of bulk rates provided by the USPS for the combining of multiple, as opposed to a single, titles and therefore higher volume.

While the bindery and presort system and the co-mailing and presort systems have reduced mail rates paid to the USPS for mailing the titles, each of these systems contain limitations that limit even further reductions in the mail rate paid to the USPS for delivering these titles. To properly understand these limitations, the two systems shall first be described with reference to prior art FIGS. 1 and 2.

Bindery with Presort System

Prior art FIG. 1 is a block diagram view of a bindery and presort system. In prior art FIG. 1, an address file 101, containing a multitude of addressee records 105, are fed to a presort module 110. The addressee records 105 generally contain delivery data including the name, city, street, street number, state and zip code of a recipient of a title. In addition, the address record 105 may also contain specific demographics of an intended recipient such as the age, gender, income, order history or other type of information that uniquely identifies the recipient. Further, the address record 105 may include instructions for content placement of printed information on the title and a PostNet bar code 106 that is an automated representation of the mailing information contained in the address record 105. The PostNet bar code 106 is placed on the title to facilitate delivery of the title along with delivery data to expedite delivery of the title by the USPS.

Still in prior art FIG. 1, the presort module 110 receives the address file 101 and sorts the address file 101 into three postal rate categories which are displayed as ECR 135, five-digit zip code 140 and three-digit zip code 145. ECR 135, commonly known as Enhanced Carrier Route 135, describes a mail rate category provided by the USPS where titles that are part of a group of ten or more titles addressed to one USPS delivery carrier route (prepared in line of travel or walk sequence order) are provided a discount rate. Likewise, five-digit zip code 140 provides a similar discount rate structure for titles that are not of sufficient quantity to qualify for the ECR 135 category, but are within the same five-digit zip code category (where ten or more titles destined for the same five-digit zip code are packaged together). Similarly, three-digit zip code 145 provides discounts for titles that are packaged if ten or more of the titles are sent to the same three-digit zip code prefix. The result of this sorting is that the mail rate data is determined for each record and attached to each record in an Optional Endorsement Line (OEL) field. The address records are in the sequence required by the USPS for those rates. Thus, at this point, the bindery and presort system 100 of FIG. 1 has received the address files 101 and presorted the address files in the presort module 110 into the ECR 135, five digit zip 140 and three-digit zip 145 categories. Then, the presort module 110 sends the sorted address file to the bind and print 120.

The bind and print 120 receives multiple signatures (sheets that make up a title) 115 and binds the titles (using well-known techniques) and then prints the address file 101, one record per piece, onto the titles. After the bind and print 120, which results in the sample printed address file 131 that is placed inside or outside of the title, the titles are bundled by rate class at 155 and then sent to the USPS at 130.

A benefit of the bindery and presort system 100 is that the presort module 110 is sent directly to the bind and print 120 that is able to use all of the information contained in the sorted address file, which includes the demographics for each recipient. Thus, as the signatures 115 are received by the bind and print 120, the demographic information is also received by the bind and print 120 so that two benefits are realized: (1) the mix of signatures 115 may be customized to the recipients based on the recipient's demographics (e.g., a woman aged 35 may receive specific signatures containing an advertisement for women's clothes, while a male teenager may receive an advertisement for rock music); and (2) customized information particular to each individual recipient may be printed within as well as outside of the title (e.g., the address information of the recipient may be printed on an inside signature (containing a return order form) of the title as well as on the outside cover of the title).

This customization aspect available in the bindery and presort system 100 is a highly desirable aspect of this system since many publishers of the titles wish to specifically target recipients to the furthest extent possible. Furthermore, the presort available with this system 100 minimizes, to a certain degree, the postage rates being paid to the USPS by bundling titles to a similar ECR 135, five-digit zip 140 or three-digit zip 145. Even further, the titles may be bundled after binding without additional handling.

However, a need exists with the system 100 to further reduce postage paid to the USPS by achieving higher volume discounts in a bindery and presort system 100. Thus, a need exists to combine the customization aspect of the system 100 with a greater volume discount to minimize postage paid to the USPS available for higher volume of bundled titles.

Co-mailer with Presort

Prior art FIG. 2 is a block diagram view of a co-mailer with presort system. Co-mailing or combined mailing is similar to the bindery and presort system 100 of prior art FIG. 1, but instead of a single title being presorted and bound as shown in prior art FIG. 1, the co-mailer and presort system 200 of prior art FIG. 2 combines multiple titles in order to achieve a higher volume discount of postage paid to a USPS for mailing the titles. However, as will be apparent in describing prior art FIG. 2, the co-mailer and presort system 200 has the limitation of not being able to customize the titles being co-mailed since no demographics for each of the recipients is being utilized by the system 200. Thus, the system 200 is co-mailing identical multiple copies of different titles that have no demographic customization whatsoever.

In prior art FIG. 2, multiple address files, address file # 1 217 and address file # 2 216, are being merged at merge 215 into one master address file list. Each address file represents the multiple recipients for one title, with multiple titles being merged at merge 215 that are being sent to the co-mail and print 225. This is exemplified by the records 205, 210. Thus, while the bindery with presort of prior art FIG. 1 only presorted and bound one title at a time, the co-mailer with presort system 200 combines multiple titles in order to achieve a higher volume discount on postage rates.

Once the address files # 1 217, # 2 216 and so on are merged at merge 215, that merged file is sent to a presort 220 that, much like the presort module 110 of system 100, sorts the merged address file by postal category such as ECR 135, five-digit zip 140 and three-digit zip 145. The sorted merged address file is then sent to the controller 224 in the co-mail and print 225.

Also being sent to the co-mail and print 225, and completely separate from the sorted merged address file, are the multiple titles being generated by signatures 230 and 231 and being bound at separate binderies at bindery 232 and bindery 233. It is noted that the separate titles being generated at binderies 232 and 233 are generic, that is, there is no customization by demographics being done during the binding of the titles at the bindery 232 and 233. Furthermore, the titles bound at the bindery stage 234 have no predetermined order, but instead are generic titles being bound. The order of these bound titles are wholly independent of the order of the address files being sequenced at the Presort 220. Understandably, due to this unrelated order of titles being generated between the binding stage 234 and the presort 220, the two subsystems cannot interact to customize the titles to particular recipients. Thus, as those titles are received by the co-mail and print 225, the sorted merged address file also being sent to the co-mail and print 225 is printed on identical and generic multiple titles being received by the co-mail and print 225.

It is therefore apparent from this description that only generic titles may be used with the system 200. While higher volume discounts for postage paid to the USPS are available since multiple address files have been merged, customization of individual titles is not possible. Signatures cannot therefore be varied by the demographics for particular recipients and printing of customized information on the outside and/or inside of the title for specific recipients is not available. Still in prior art FIG. 2, a portion of the address file printed on the individual titles is shown at 226 which is then bundled at 227 and sent to the USPS at 228.

A need therefore exists for a method and system for combined mailing of multiple titles that allows for customization of the titles as well as obtaining large volume discounts in postage paid to the USPS by co-mailing multiple titles.

SUMMARY OF THE INVENTION

The present invention provides for a system for combined mailing of a plurality of diverse publications to a plurality of recipients at an optimized mail rate. The system includes a bindery for binding a plurality of the signatures where the bindery binding the plurality of signatures creates a plurality of first publications and a plurality of second publications. Each of the plurality of first and second publications are in a unique order, where the unique order identifies each of the plurality of first publications and each of the plurality of second publications with each of the plurality of recipients. The system further includes a co-mailer for combining the plurality of first publications with the plurality of second publications to form a plurality of diverse publications. The co-mailer merges the plurality of first and second publications in the unique order to send the plurality of diverse publications to the plurality of recipients at the optimized mail rate.

The present invention further provides for a method for co-mailing of a plurality of diverse publications to a plurality of recipients at an optimized mail rate. The method provides for providing a unique order to a bindery, the unique order defining an order that each of the plurality of publications are bound by the bindery. Then binding, by the bindery, a plurality of the signatures to create the plurality of publications, where each of the plurality of publications is in the unique order. Then, co-mailing the plurality of diverse publications by merging the plurality of diverse publications in the unique order to send the plurality of diverse publications to the plurality of recipients at the optimized mail rate.

Also provided is a computer readable medium having computer instructions stored thereon that, when loaded into the computer system, cause the computer system to perform the method for co-mailing of a plurality of diverse publications to a plurality of recipients at an optimized mail rate as described above.

The present invention further provides for a system for co-mailing of a plurality of diverse publications to a plurality of recipients at an optimized mail rate which includes a co-mailer for combining the plurality of diverse publications, where the co-mailer merges the plurality of diverse publications. The system further provides for a sortation device coupled and in communication with the co-mailer where the sortation device sorts each of the plurality of diverse publications from the co-mailer by the optimized mail rate.

A method for co-mailing a plurality of diverse publications to a plurality of recipients at an optimized mail rate is also provided by co-mailing the plurality of diverse publications by merging the plurality of diverse publications in a unique order and then sorting each of the plurality of diverse publications from the co-mailer by the optimized mail rate to deliver each of the plurality of diverse publications to the plurality of recipients at the optimized mail rate.

BRIEF DESCRIPTION OF THE DRAWINGS

A more complete appreciation of the invention and many of the advantages thereof will be readily obtained as the same becomes better understood by reference to the detailed description when considered in connection with the accompanying drawings, wherein:

FIG. 4 is a flow diagram of an embodiment of the method of the present invention;

FIG. 5 is a flow diagram of an embodiment of the method of the present invention;

FIG. 6 is a flow diagram of an embodiment of the method of the present invention;

FIG. 7 is a flow diagram of an embodiment of the method of the present invention;

FIG. 8 is a flow diagram of an embodiment of the method of the present invention;

FIG. 10 is a flow diagram of an embodiment of the method of the present invention;

DETAILED DESCRIPTION OF THE PREFERRED EMBODIMENTS

Figure 3:
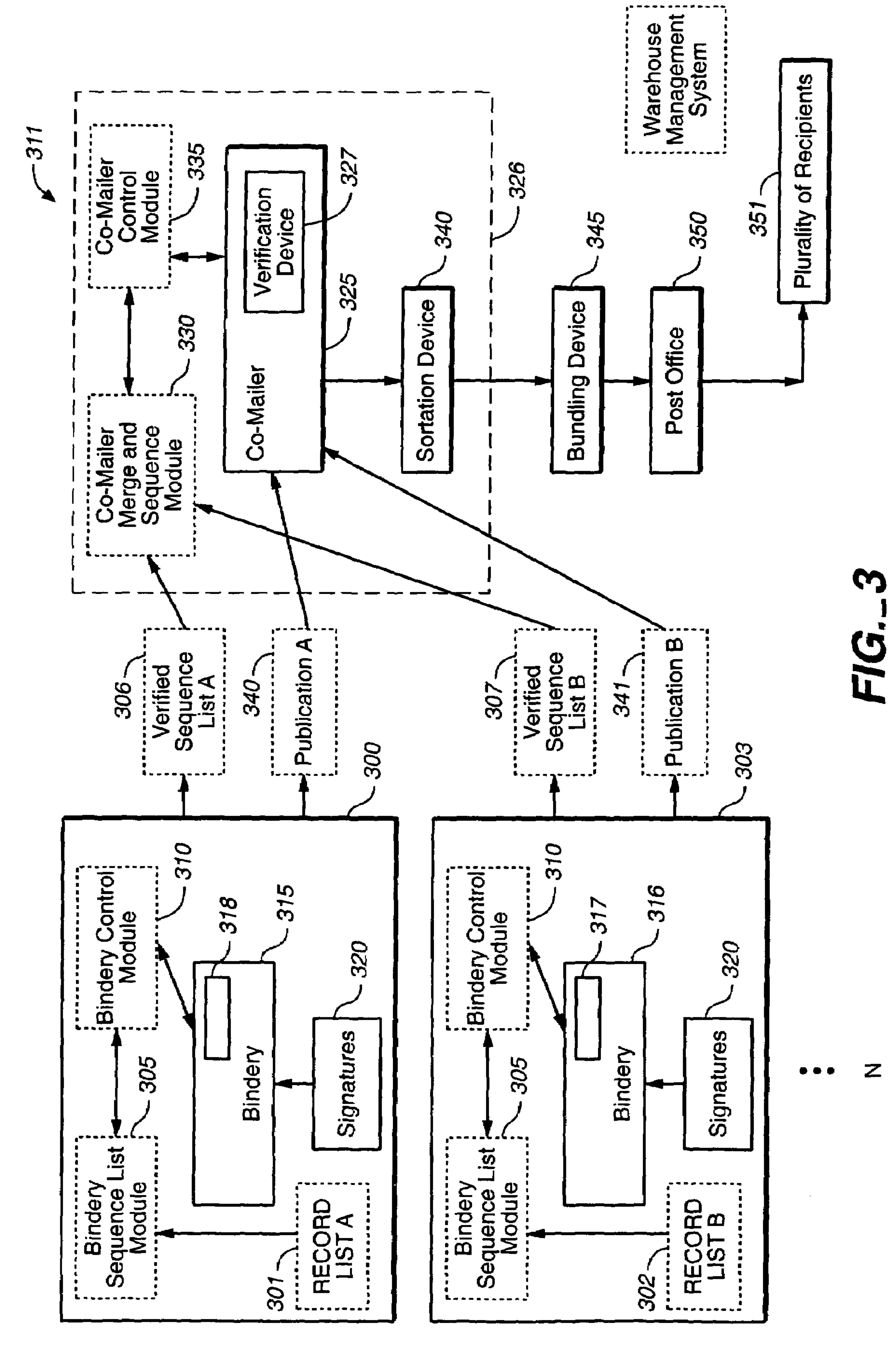
FIG. 3 is a block diagram view of an embodiment of the system of the present invention.

FIG. 3 is a block diagram view of an embodiment of the system for combined mailing (co-mailing) of a plurality of diverse publications of the present invention. In FIG. 3, two major subsystems are shown: (1) bindery systems 300, 303 . . . N; and (2) a co-mailer system 326. Beginning at the bindery systems 300 and 303, a plurality of binderies 315, 316 . . . N are shown. It is noted that the number of binderies may vary in the system for co-mailing the plurality of publications and, in one embodiment, may have anywhere from two to thirty binderies in order to bind up to thirty diverse publications. Thus, in FIG. 3, bindery 315 may be considered, in one embodiment, a first bindery and bindery 316 may be a second bindery. It is noted that the diverse publications may also be bound by single bindery. Publications are understood to mean any bound, printed matter including, but not limited to, magazines, catalogs, periodicals, books, and the like. A plurality of binderies 315, 316 . . . N therefore exists in a typical printing facility that create and prepare for mailing a plurality of publications. The binderies 315, 316 may be any standard binderies, for example, the Müller Martini Prime Saddle Stitcher bindery manufactured by Müller Martini of Zufingen, Switzerland and described in the publication "the Prima Saddle Stitcher—Fast Makereddy and High Output for Maximum Production Flexibility" dated October of 1995, and incorporated herein by reference. It is therefore understood that while the embodiment of FIG. 3 depicts two bindery systems 300, 303 for binding two publications (A, B), other embodiments may contain more binderies (and bindery systems), or even the same two binderies where those two binderies bind more than two publications.

Within each bindery system, there are multiple embodiments of elements, including hardware (bindery 315,316 and signatures 320), software (bindery sequence list module 305 and bindery control module 310), and data (record lists A 301 and B 302). It is noted that these elements may be located at various locations in the system, including within the bindery 315, 316, or be located in distant locations, as long as the elements are able to communicate and physically interact where needed. Each bindery system 300, 303 . . . N includes a record list 301 (A), 302 (B) that contains a plurality of records, each record containing fields containing identifier information about a recipient of the publication (A, B . . . N) being generated by the system of FIG. 3. For example, in one embodiment, the records contain the fields as shown in FIG. 4 below, including a record number, a name, a street number, a street, a city, a zip code, a customer information, a carrier route, a walk sequence, a title, a source code, and the placement and orientation of an optional endorsement line (OEL). Many of these fields are identifier information that describe the recipient by residential location (street number, street, city, zip code, carrier route and walk sequence). The other fields, however, provide specific demographics about each recipient, through the customer information number, that may describe the gender, age, income, hobbies and other demographic information about the recipient. A source code (SC) provides information concerning the specific publication being printed such as the date printed, the version of the publication and other internal information concerning the publication. The OEL is a line that is placed on the publication, at a placement and orientation decided by the publisher, that indicate the mail rate paid for mailing the publication. The fields in the record list 301, 302 may include many other fields that identify the recipients, the publication or the bindery system 300, 303.

Still in FIG. 3, the record list 301 is transmitted to a bindery sequence list module 305, which is a software module in one embodiment, that is able to receive the record list A 301 and place the records contained in the record list A 301 into a sequence list module as shown in FIG. 5 below. By record list "A," it is understood that the bindery system 300 is binding publication A, a first publication in one embodiment, that may be any publication as publication is defined above. While the system 311 of FIG. 3 depicts two publications, a first publication A, and a second publication B, it is understood that many more publications may be used in other embodiments of the system 311. The record list A 301 is data that may be contained in any format as long as it may be communicated to the bindery sequence list module 305. The bindery sequence list module 305 is, in one embodiment, computer code that may be written in any well-known programming languages such as C, C++ or the like.

It is noted that the record list A 301 and the bindery sequence list module 305, as well as the bindery control module 310, are, in one embodiment, software modules that may exist either on the bindery 315 or outside of the bindery but in communication with bindery 315. Thus, it is only desired that the record list A 301, the bindery sequence list module 305 and the bindery control module 310 exchange data and instructions with one another and bindery 315. Also as part of the bindery system 300 are signatures 320 which are individual sheets of print matter that will be bound by the bindery 315 as is well known in the art. The signatures 320 are a collection of sheets that may be selectively combined by the bindery 315 dependent on certain identifier information contained in the record list A 301. Again, it is noted that multiple bindery systems 300, 303 . . . may exist in a printing facility that are used to bind the publications being generated from each bindery. Typically, publications include one particular title from a given publisher. An example of a publication is *Time Magazine*®. Another example of a publication is *Sports Illustrated*®. A third example of a publication is a *Land's End*® mail order catalog. A fourth example of a publication is the book, *Wizard of Oz*. It is noted that there may be, in one embodiment, certain size restrictions to the publications, for example, up to a maximum height, length and thickness, or even a maximum weight. Diverse publications, on the other hand, include two or more publications, such as the first publications A and the second publications B. For example, bindery 315 may bind a publication that is

*Time Magazine*®. Bindery 316 may also bind a publication such as a *Land's End*® mail order catalog. Together, this is an example of diverse publications being generated by binderies 315 and 316. Again, up to thirty different diverse publications may be generated in one printing facility, in one embodiment, but an unlimited number may be generated in other printing facilities. Diverse publications may include, in another embodiment, two diverse publications, a first publication and a second publication.

The bindery sequence list module 305 contains sequencing rules for a predetermined sequence that receives the record list 301 and rearranges the record list 301 in accordance with those sequencing rules. As described further in FIG. 5, the bindery sequence list module 305 contains three sequencing rules to generate a predetermined sequence and obtain a sequence list from the record list: (1) sequencing by zip code beginning with the lowest zip code (e.g. 00001); (2) within each zip code, sequencing by carrier route; and (3) within each carrier route, sequencing by walk sequence number with the lower walk sequence number being first. Thus, the bindery sequence list module 305 contains, in one embodiment, computer instructions in programming code that is able to receive the record list 301 for a particular publication A and is able to re-sequence that record list in accordance with the rules provided above.

These sequencing rules enable the record list to be reorganized into a unique order. While this unique order will be maintained in the sequence list throughout the methodology of the system 311 of the present invention, the unique order need not be limited to the sequence rules provided above. Rather, the unique order is any order to the record list and, ultimately, the plurality of publications, that identifies each of the publications (e.g. the first publication A, the second publications B, etc.) with each of the recipients that will receive the publications. In one embodiment, the unique order is a demographically-based unique order that identifies each of the plurality of publications to each of the plurality of recipients based on the demographics of the recipients. The unique order of the record list and publications is kept in this unique order coming off the bindery 315 and onto the co-mailer 325 as will be described in more detail below. A benefit of maintaining the unique order at both the bindery 315 and at the co-mailer 325 is that the unique order allows the system 311 to provide both the customization of signatures at the bindery (based on the identifier information of the recipient) and allows the merging of a plurality of diverse publications (e.g. first publication A, second publication B, third publication C and so on) to obtain volume discounts for mailing the diverse publications at an optimized mail rate.

Still in FIG. 3, the bindery sequence list module 305 sequences the record list in a predetermined sequence using the sequence rules to obtain a sequence list that rearranges the record list in accordance with those rules. Once the sequence list (FIG. 5) is generated, the sequence list is transmitted to a bindery control module 310. The bindery control module 310 is, in one embodiment, a software module that controls the bindery 315. The bindery sequence list module 305 is in communication with the bindery control module 310 through any means of exchanging data or electronic signals. For example, the bindery sequence list module may transmit, to the bindery control module 310, data or electronic signals through wires, cable, wireless technologies, or other means of transmitting electronic signals and data well-known in the art. The bindery control module 310 drives the bindery to bind the signatures 320 being transferred to the bindery 315. Based on the sequence list, the bindery control module 310 selects which of the signatures 320 will be bound into each copy of the first publication A by using the fields contained in the sequence list. That is, certain fields in the sequence list contain demographic information concerning the particular recipient in the record. This particular identifier information may be in the Customer Information field, as shown in FIG. 5. From that Customer Information field, the bindery control module 310 is able to selectively choose certain signatures from the plurality of signatures 320 to bind specifically for a particular recipient. Thus, if the Customer Information field of a particular recipient set forth that the recipient is a 35 year-old male, then particular signatures customized to a 35 year-old male, such as golf advertisements, may be included in the publication being bound for this particular recipient. This customization provides a benefit to the publisher since the publisher is able to customize advertising and other content to specific individuals rather than sending the exact same generic publication to all recipients. Furthermore, specific identifier information may be printed on the specific signatures 320, including for example, the name, street number, street, city, state and zip code. Customer information and source code may also be printed, as well as the PostNet. Any of the identifier information may be printed at the bindery. The identifier information is able to be printed on both an inside signature 320 (for example an order form inside the publication that contains the recipient's name, address, etc.) and outside of the publication for purposes of mailing the publication to the recipient. The mail rate is determined (FIG. 9 below) and printed on the publication at the co-mailer since the volume discount will not be known until the plurality of diverse publications are received at the co-mailer. After the signatures 320 are bound by the bindery 315, the weight and thickness of each bound publication is determined and entered into the sequence list as other fields. This weight and thickness measurement may be performed using well-known measuring techniques in the industry.

Thus, at this point, the bindery 315 has bound and printed a first publication A 340 with (1) customized printed identifier information on the outside and/or inside of the publication; and (2) customized signatures 320 in different publications for different recipients. The bindery is therefore prepared to send this bound first publication A 340 to the co-mailer 325 to be combined with other publications (e.g. second publication B 341). Here, the importance of maintaining an exact correspondence between the unique order of the sequence list and the unique order of the first publication A 340 is understood. Since each publication in the first publication A 340 has unique identifier information on the publication (e.g. name, address, etc.) and unique signatures for different recipients, the unique order of the publications coming off the bindery must be maintained with the unique order of the sequence list. If even one record in the sequence list is lost, or if a single publication is lost, the system may be sending the wrong customized publication to the wrong recipient. It is this unique order that is maintained between the bindery and the co-mailer that provides one of the many benefits by the system and method of the present invention. While the unique order maintained between the bindery and co-mailer is not the only benefit of the present invention, it does provide a significant improvement in the art.

After the weight and thickness of each publication is determined, the unique order of the publications bound by the bindery 315 are verified by the bindery through a verification device 317, 318. The verification device is any device that is able to verify, through scanning, (either magnetically or electronically), using image comparators, bar codes, etc. each publication that has been bound to compare the unique order that the publication is in with the unique order in the sequence list. This verification process results in verified sequence list 306 (FIG. 6) for each publication. The verified sequence list 306 is able to locate any errors in the unique order between the physical publications and the sequence list. If any error occurs and a publication is out of order or damaged, that record in its entirety in the verified sequence list is transferred to a portion of the verified sequence list designated as "Mixed Mail." Mixed mail will essentially print the identifier information for that recipient on a generic copy of the publication when generated through the co-mailer. After going through the verification device, the first publication A 340 and second publication B 341 may be removed and stored in the unique order that the publications were bound by the bindery 315. Thus, there is no requirement that the publications bound by the bindery 315 be immediately sent to the co-mailer 325. In fact, it is another benefit of the system of the present invention that the different publications may be stacked and maintained in their unique orders for extended periods of time and yet be later moved to the co-mailer to be combined with many other diverse publications, yet the unique order is maintained. The first publication A 340 and second publication B 341 are therefore physically sent to the co-mailer 325 when the publication is ready to be mailed.

Likewise, the verified sequence lists 306, 307 for the diverse publications (A 340, B 341) would also be stored until the corresponding publications are ready to be co-mailed. Again, the verified sequence list and the publications need only be identified and stored until needed, as long as the unique order is maintained. When the publications are ready to be co-mailed, the verified sequence lists 306, 307 are transferred to the co-mailer merge and sequence module 330 that is in communication with the co-mailer 325. The co-mailer merge and sequence module 330 is, in one embodiment, a software module that is able to receive the plurality of verified sequence lists and merge the verified sequence lists into the same unique order by using the predetermined sequence rules used by the bindery sequence list module 305. The result of this merger is a merged verified sequence list (FIG. 8) that contains, in one embodiment, up to thirty separate publications in one merged verified sequence list. This merged verified sequence list is kept in data format, such as on a magnetic tape or other storage device (FIG. 14) so that it may be used readily by the co-mailer. It is noted that the merge of the verified sequence lists may happen prior to sending the publications to the co-mailer. That is, the verified sequence lists may be merged after a predetermined number of verified sequence lists are generated and then the merged verified sequence list for those publications may be stored until the publications are ready to be co-mailed.

After the merge of the verified sequence lists, the merged verified sequence list is used to determine the optimized mail rate for each record in the merged verified sequence list and the mail rate is added as a field in the merged verified sequence list for each recipient (FIG. 10). The determination of the optimized mail rate is described in detail below with the detailed description corresponding to FIG. 9. In essence, the optimized mail rate is determined by the constraints of the USPS that is being utilized. Thus, if the USPS sets forth a discount rate for a particular number of publications sent to one specific location, then the co-mailer merge and sequence module 330 would contain software, in one embodiment, that determine the appropriate mail rate for each piece based on the guidelines of the USPS. At present, the USPS provides discount rates for, within a given five digit zip code, ten (10) or more pieces within the same carrier route. If less than 10 pieces are to be delivered within the same carrier route, the USPS provides discounts for 10 or more pieces within a five digit zip code. If less than 10 pieces are to be delivered within the same five digit zip code, the USPS provides discounts for 10 or more pieces within the same three digit zip code (e.g. first three digits in zip code). Any publications not fitting within these present guidelines are sent with full postage under mixed mail. After the mail rates have been entered into the field of the merged verified sequence list to create an optimized merged verified sequence list, the optimized merged verified sequence list is transmitted to the co-mailer control module 335 that drives the co-mailer 325. Once at the co-mailer control module 335, the final printing of the mail rate and sortation of the plurality of diverse publications may occur at a print table of the co-mailer.

Figure 12:
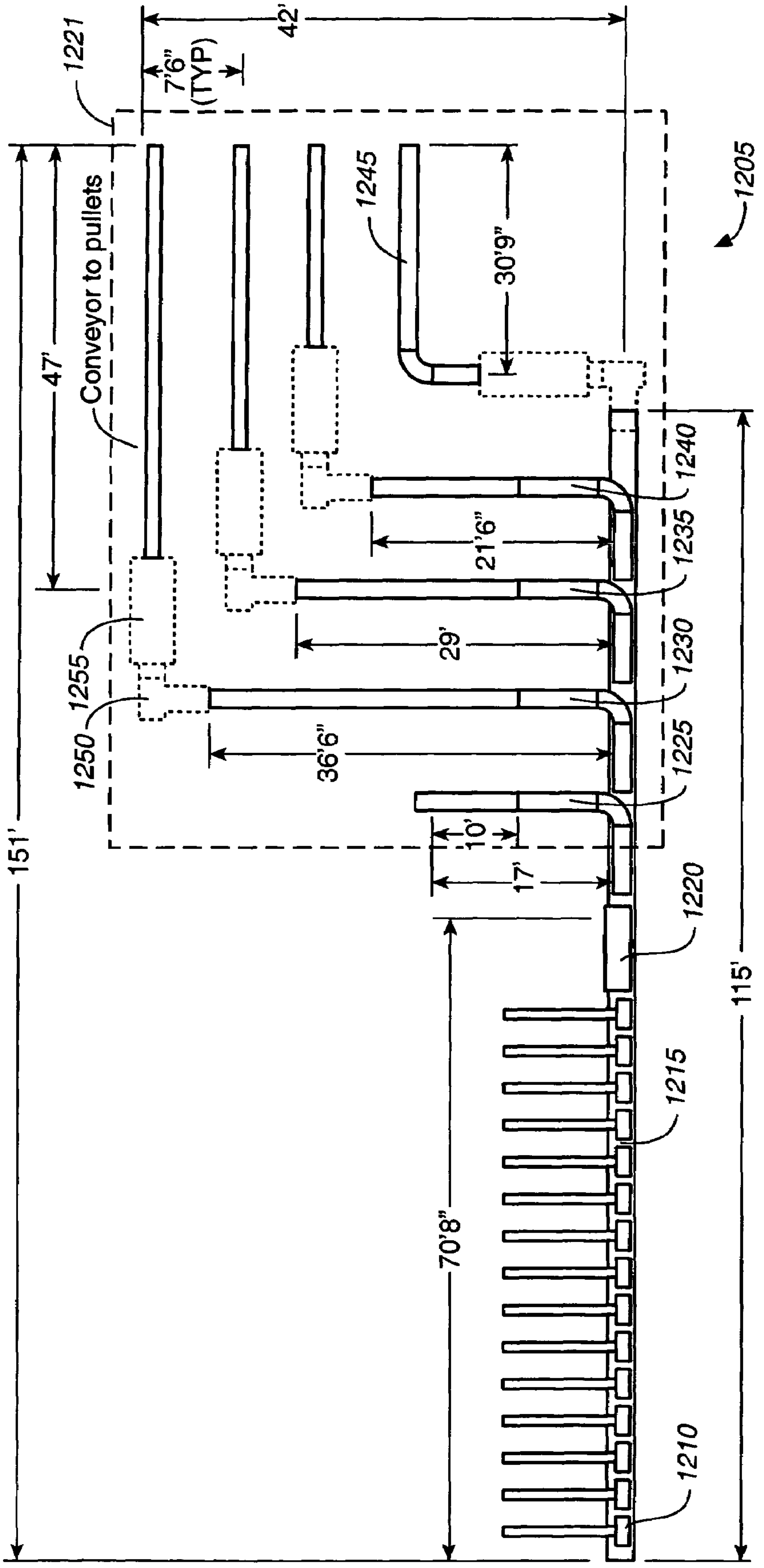
FIG. 12 is a plan view of an embodiment of the co-mailer of the present invention.

At the co-mailer 325, the plurality of diverse publications (publication A 340, publication B 341, etc.) that are all represented in an optimized merged verified sequence list are stacked in certain "pockets" 1210 (FIG. 12) on the co-mailer as described in more detail with reference to FIG. 12 below. The optimized merged verified sequence list then informs the pockets as to which pocket should place the next publication at the pocket into a merge stream that carries the publications to a print table 1220 (FIG. 12). The merge stream is typically some type of piece conveyer, such as a chain conveyer. It is now apparent that the unique order has been maintained throughout the system 311 since the optimized merged verified sequence list is able to instruct specific pockets to place its publication on the merge stream since the co-mailer control module knows exactly which publication is at which pocket and the exact order of the publications. As the publications are placed on the merge stream, the unique order of the publications is again verified through another verification device 327 that scans, much like the verification device 318 on the bindery 315, each publication to ensure that it is the correct publication. If not, the publication is discarded and the corresponding record is placed in the mixed mail category. Each publication continues down the merge stream until it reaches a print table where the optional endorsement line (OEL) containing the optimized mail rate is printed on the publication from the corresponding field in the optimized merged verified sequence list. In an alternative embodiment, if an incorrect or damaged publication occurs on the merge stream, the co-mailer may be stopped, the incorrect or damaged publication removed and replaced with a generic copy. In this embodiment, complete addressing would be done at the print table, described below. In any insert verification process, additional steps will be taken to resynchronize the merged sequence list with the order in which the publications are presented in the pockets.

At the print table, two print heads, a first print head and a second print head (FIG. 11), are used to place the optional endorsement line in a variety of places and orientations on the plurality of diverse publications. In one embodiment, the print heads are two Dijit® 6240 Printheads manufactured by Scitex Digital Printing, Inc. of Dayton, Ohio. These print heads permit the printing of the OEL (mail rate) on the publications in customized orientation and placement on the publications in accordance with the publisher's requests. By using two print heads, almost a full two-thirds of a publication's cover may be printed on and the orientation of the identifier information printed by either parallel to or perpendicular to the flow along the merge stream.

After the print heads print the optional endorsement line on the publications, each of the publications are once again verified using the techniques described above to ensure quality. Then, the publications are sorted using a sortation device 340. The sortation device 340 may be part of the co-mailer 325 or may be a separate device that is coupled to and in communication with the co-mailer 325. The sortation device 340 enables the publications to be sorted by the mail rate category (ECR, 5-digit zip code, 3 digit zip code) by providing a number of different sort lanes, e.g. three separate sort lanes in one embodiment, after the print table. The sortation device provides the ability to separate individual pieces for bundling of the publications within the mail categories since the publications in only that mail rate category are received at a particular bundling device 345 to be bundled and sent to the USPS 350. Ultimately, each of the plurality of recipients 351 receives the plurality of diverse publications. The use of the system 311 of FIG. 3 will now be described with reference to a comprehensive example depicted through the flow charts of FIGS. 4–10 below.

COMPREHENSIVE EXAMPLE

A comprehensive example will now be provided to describe the use of the system 311 of FIG. 3. It is understood that different embodiments will be described for the elements of FIG. 3 in this comprehensive example. In providing those different embodiments, different element numbers may be used throughout the comprehensive example for elements similar to or identical to the elements of FIG. 3. In such instances, where the elements are intended to be identical, the element titles shall remain the same, even if the element numbers have changed in different figures.

FIG. 4 is a flow chart of an embodiment of the method for co-mailing a plurality of diverse publications of the present invention. In FIG. 4, the same record list 445 is displayed in two manners: (1) in a representational manner as each record would appear on an address label (405, 410, 415, 420, 425, 430, 435, 440) and (2) in the data format that the record list would appear in the record list 301 of FIG. 3. From FIG. 4, it is clear that each record represents a different recipient (Alpha, Beta, Gamma, Delta, Epsilon, Zeta, Eta, Theta) and contains a number of fields, i.e. identifier information (Record #, Name, Street #, Street, City, Zip code, Customer Info., Carrier Route (CR), Walk Sequence (Walk Seq.), Title, Source Code (SC) and Optional Endorsement Line (OEL), placement and orientation data). While this embodiment contains these specific fields, it is understood that other embodiments may contain more or less fields. These fields are the identifier information of each recipient and includes all the demographic information that is contained in the Customer Information fields and the Demographics fields. While the demographic information contained in the present field, Demo., shows a M for male or F for female, it is understood that other demographic information describing the recipient is also available and may be presented in the additional demographic field such as age, income, past order history, interests and other identifier information that describes a recipient. This type of information is used to determine the demographically-based unique order of the present invention in one embodiment. The record list 445 is generally a data list owned by a publisher of a publication or purchased by a publisher from other sources. The record list 445 further contains a customer info. field which is generated by the publisher to link the publisher to other identifier information and is generally printed on the publication itself so that a publisher knows the customer information from an order form containing the customer information or that customer information is given to a publisher orally when a customer makes an order in a catalog, for example.

Also in the record list is the carrier route (CR) and walk sequence which are set by the USPS. The record list also identifies the publication by title. A source code (SC) links each publication to a particular version or edition of the publication. For example, in one embodiment, if the publication is a catalog, the source code would identify the summer, spring or other seasonal edition of the catalog. In another embodiment, the publication is a magazine that has a source code identifying the month that the magazine is published. Another field in the record list is the optional endorsement line (OEL) that contains location of where the OEL (mail rate that will be paid by the publisher) will be placed on the publication by the length (X), width (Y) and horizontal (H) (parallel to the flow of the merge stream) or vertical (V) (perpendicular to the flow of the merge stream) of the publication. The placement of the OEL is determined by the publisher according to the design of the publication and is located generally above the address information of the recipient. The record list may contain other fields than those listed and need only have identifier information that identifies the recipients and the publications. When the record list 445 is transmitted to bindery sequence list module 505 (FIG. 5), the bindery sequence list module 505 receives the record list 445 and sequences the record list in accordance with FIG. 5 below.

FIG. 5 is a flow chart of an embodiment of the method for co-mailing a plurality of diverse publications of the present invention. In FIG. 5, the record list of FIG. 4 is received by the bindery sequence list module 505 (305 of FIG. 3) and a predetermined sequencing is performed on the record list 445 in accordance with the sequencing rules set forth in the bindery sequence list module 505. In FIG. 5, the predetermined sequencing is performed in three steps: (1) sequence by zip code beginning with the lowest zip code; (2) within each zip code, sequence by carrier route; and (3) within each carrier route, sequence by walk sequence with lower walk sequence first. It is understood that these sequence rules (1)–(3) are only one embodiment of the sequence rules that may be used to sequence the record list 445 into a unique order. The sequencing rules are developed from the USPS guidelines that set forth the discount postage rates provided by the volume of publications mailed in bundles. Thus, in other embodiments, the sequencing rules may differ, yet fall within the scope of the present invention as claimed below. Still in FIG. 5, the sequence list 510 has been generated by the record list 445 undergoing the sequence rules 505. Thus, as can be seen by the Record # field that shows the prior order in the record list, the records have been rearranged to a new sequence # order based on the sequencing rules. In this embodiment, Beta and Zeta have the lowest zip code of 02163 and therefore are placed first, while Gamma and Eta have the highest zip code of 60602 and are placed last. It is understood that while only 8 recipients are listed in the embodiment of FIG. 5, in alternative embodiments, more or less recipients may be listed, and in one embodiment, about three million recipients may be in a record list 445. Within the same zip code, the sequence list 510 has placed Beta above Zeta because Beta has a lower walk sequence than Zeta even though both are in the same carrier route of 002. Similarly, Alpha and Epsilon have the same five digit zip code (30015) and carrier route (001), but Alpha has a lower walk sequence (WS20) than Epsilon (WS35). At this point, the sequence list is fed to the bindery control module 310 (FIG. 3) where the bindery control module 310 controls the mix of signatures selected for each piece and the printing of identifier information (from the fields) on the signatures in the sequence number order of 510. Thus, at bindery 515, the signatures are received and bound with the identifier information (e.g. name, street number, etc.) placed both outside and inside of the publication on specific signatures. Also, as the signatures are bound, the signatures may be customized based on the demographics or other fields in the sequence list 510. Thus, one publication may have advertising for women for Jill Beta, while another publication may have advertising for men for John Alpha.

Figure 1:
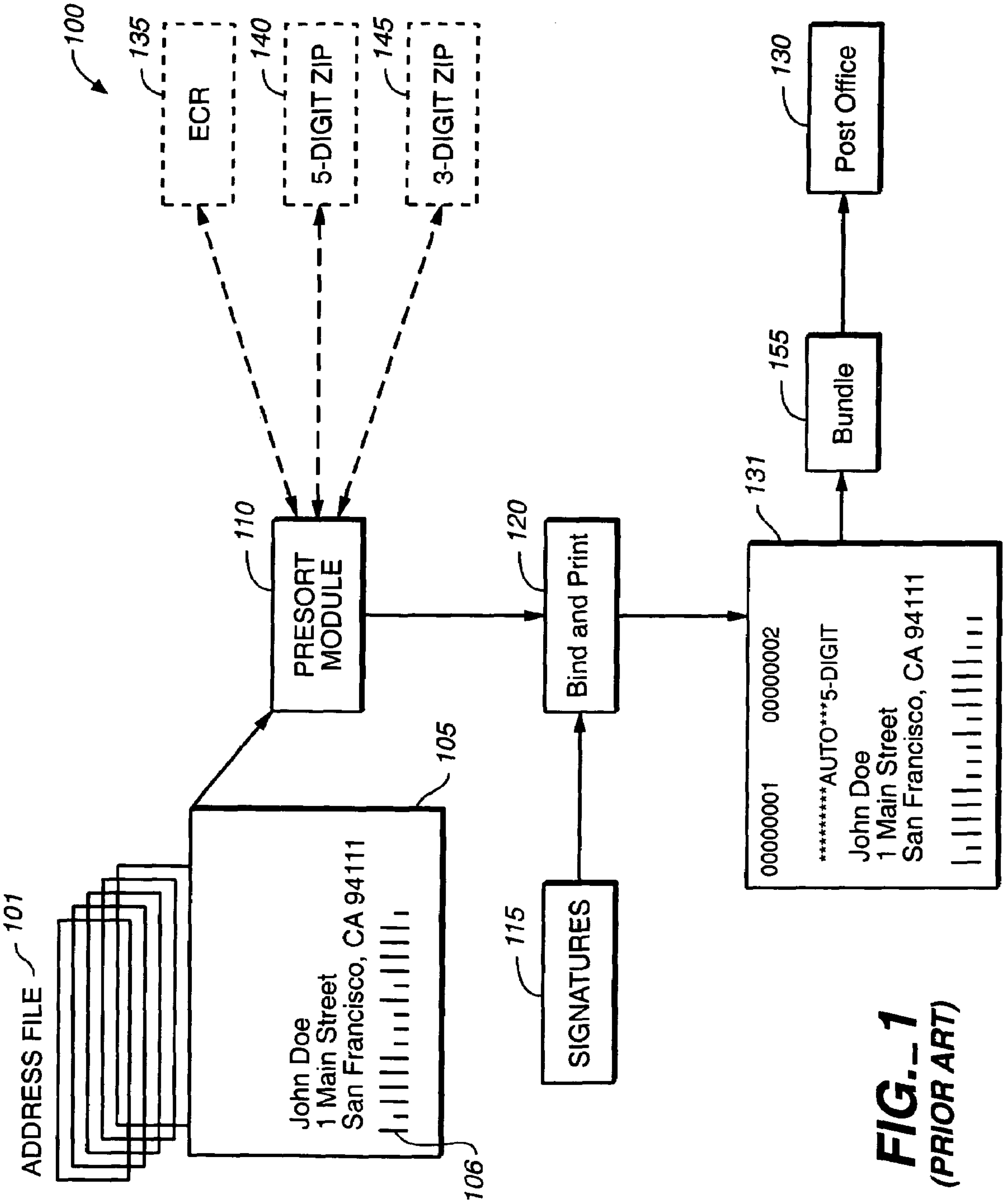
FIG. 1 (PRIOR ART)
FIG. 1 is a prior art block diagram view of a bindery and presort system.
Figure 2:
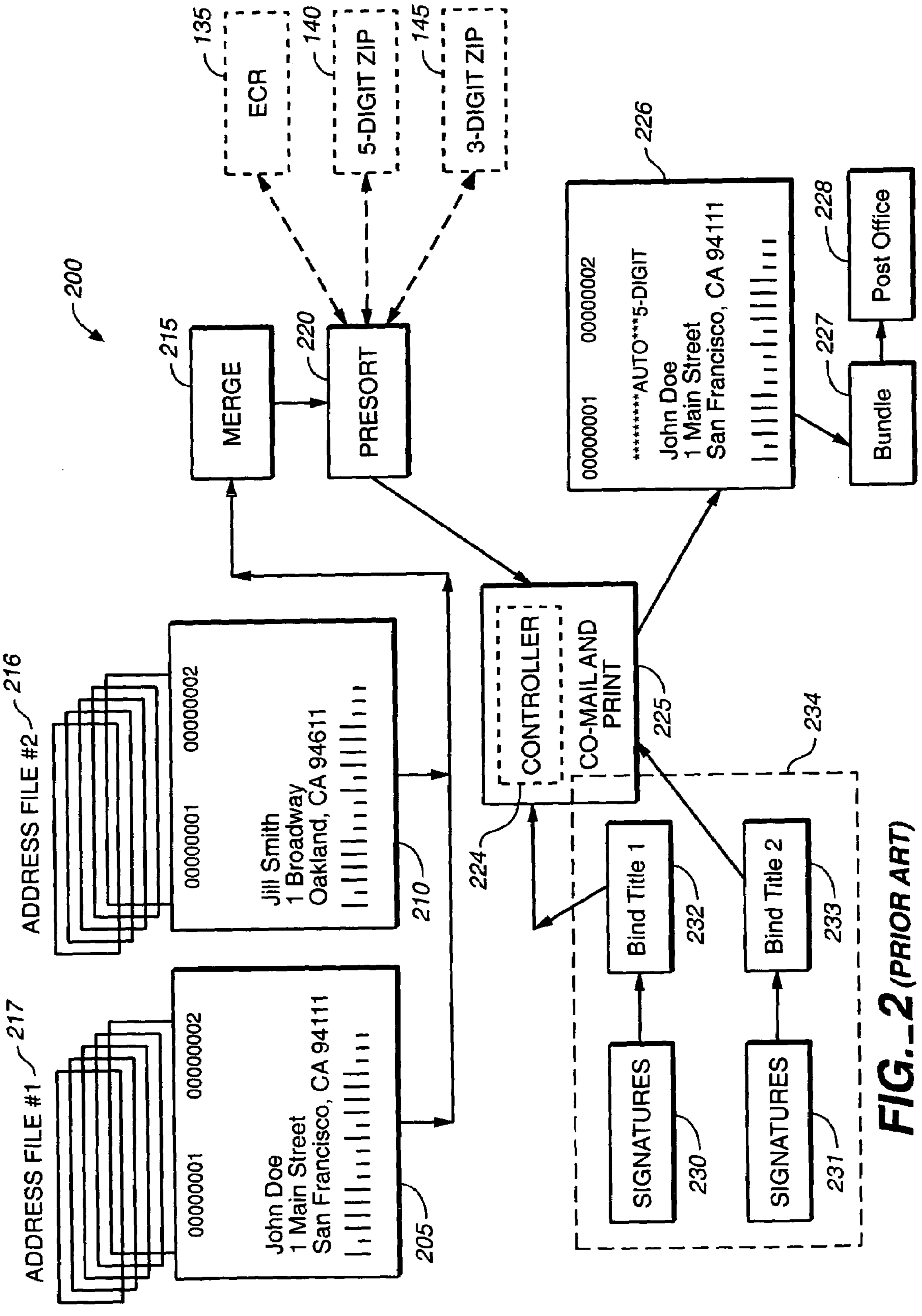
FIG. 2 (PRIOR ART)
FIG. 2 is a prior art block diagram view of a co-mailer and presort system.

Due to this customization, the unique order that the publications are bound must be maintained to correspond directly with the sequence list. That is, in the past (e.g. as shown in prior art FIG. 2), a bindery bound generic publications that were then sent to a co-mailer as generic publications and sequencing did not need to be controlled because all the publications were the same. Now, the unique order of the publications being bound by the bindery that will be sent to the co-mailer must be maintained throughout the system since that unique order between the physical publications and the sequence list will ensure that the customized publication (customized by different signatures and printed identifier information such as name, street, city, state, etc.) will be given the optimized mail rate. Furthermore, at this stage, no mail rate has been determined since the mail rate will be determined at the co-mailer where more of a volume discount may be taken advantage of.

However, it is noted that in an alternative embodiment, the mail rate may be determined prior to binding the publications at the bindery. In this embodiment, the record list would be sequenced and then multiple sequenced lists would be sent to a co-mailer merge and sequence module to merge various publications to take advantage of the volume discount of mailing many more publications. Then, after the mail rate is determined at the co-mailer merge and sequence module, the optimized merged sequence list would be sent back to the bindery were the bindery would use the optimized merged sequence list to print the mail rate at the bindery, rather than the co-mailer. It is understood that the unique order between the bindery and the co-mailer must be maintained to correspond to the sequence lists, and the order of binding versus co-mailing or the order of placing the mail rate at the bindery rather than the co-mailer is secondary to the unique order being maintained, in this alternative embodiment.

Still in FIG. 5, the bindery 515, after binding the signatures, measures the thickness 520 and weight 525 of the publications bound, and enters, for each publication, the corresponding thickness and weight into the sequence list 510. Also, a verification device 530 is found on the bindery that confirms, after the publications have been bound, that the sequence list order and the physical publication order are the same. This verification device, in one embodiment, may be an OCR scanner/reader as are well-known in the art. The verification device may read the name, street number, street, city, etc. fields printed on the publication to confirm that the sequence list order is the same as the physical order of the publications. Once through the verification device, the sequence list is updated to form the verified sequence list of FIG. 6.

FIG. 6 is a flow chart of an embodiment of the method for co-mailing a plurality of diverse publications of the present invention. In FIG. 6, two representations of the records contained in the verified sequence list A 605 are shown: (1) an address label representation (610, 615, 620, 625, 630, 635, 640, 645) and (2) a verified sequence list A 605. The verified sequence list A 605 has identified, in this embodiment, a bindery error for sequence number 5 in sequence list 510, Kim Delta. Thus, for example, the publication that was addressed to Kim Delta has been damaged or otherwise misprinted and therefore that record has been moved to the mixed mail category of the verified sequence list 605 and all the remaining records have moved up a number in the sequence number. Kim Delta, in this embodiment, will therefore receive a generic publication when at the co-mailer 325 of FIG. 3. Note also that additional fields have been added to the verified sequence list 605 including a Weight, Thickness and Bundle field for each record in the verified sequence list. These fields were determined at the bindery after binding. The verified sequence list 605 is generated for each publication and will be merged by the co-mailer as shown in FIG. 7.

FIG. 7 is a flow chart of an embodiment of the method for co-mailing a plurality of diverse publications of the present invention. In FIG. 7, two verified sequence lists, A and B, are to be merged at the co-mailer merge and sequence module 330 of FIG. 3. It is understood that many more publications may be merged at one time, and in one embodiment, up to thirty diverse publications are merged in one co-mailer, with each publication containing a plurality of publications in excess of three million publications. In FIG. 7, the verified sequence list A 605 from FIG. 6 is going to be merged with the verified sequence list B 710. The verified sequence list B contains 8 records, however, like the verified sequence list A, more or less records may be included, with one embodiment containing approximately three million records.

FIG. 8 is a flow chart of an embodiment of the method for co-mailing the plurality of diverse publications of the present invention. In FIG. 8, the verified sequence list A 605 has been merged with the verified sequence list B 710 to form the merged verified sequence list 805 (FIG. 8). In forming the merged verified sequence list 805, the same sequencing rules from the bindery sequence list module 505 (FIG. 5) is applied when merging the two verified sequence lists 605, 710. Again, it is understood that in alternative embodiments many more verified sequence lists are included, where each verified sequence list represents a plurality of one publication, rather than a plurality of diverse publications. Alternatively, a verified sequence list may represent more than one publication. From FIG. 8, the merged verified sequence list has rearranged the two verified sequence lists 605, 710 using the sequencing rules used in the bindery sequence list module 505 of FIG. 5. Thus, for example, the lower zip codes are listed first (02163), then the carrier routes (all the same for 02163 of 002), then by walk sequence (lowest walk sequence first). The same sequencing rules are used as were used on the bindery sequence list module 505 (FIG. 5) since the unique order of the merged verified sequence list 805 must remain consistent with the unique order of the physical publications. Note that while different verified sequence lists have been merged, the unique order is still in the same sequence order that the publications were customized in at the bindery. Thus, when the merged verified sequence list is sent to the co-mailer and the physical publications are also sent to the co-mailer, the merged verified sequence list and the physical publications are in the same unique order. Although the physical publications are in the same unique order by publication alone, and not merged as is the merged verified sequence list, the co-mailer is able to use the merged verified sequence list to cause the physical publications to the merged verified sequence list in a number of alternative methods. One such method is to place each of the diverse publications at a different "pocket" or feeder into the merge stream of the co-mailer. The co-mailer control module directs the sequence of operation of the co-mailer. This is accomplished by the co-mailer control module directing the co-mailer to drop a publication from a particular pocket onto the merge stream when the sequence number for that particular publication is read. Then the co-mailer control module tracks the publication once it is on the merge stream. Since the publications at each pocket are in the same sequence as the records in the merged verified sequence list, the correct publication should be sent from the pocket to the merge stream corresponding to the verified sequence list. In alternative embodiments, different fields of the merged verified record list may be used to identify the next record in the verified sequence list and to have the pocket send the corresponding publication to the merge stream to print the OEL on the publication.

Figure 9:
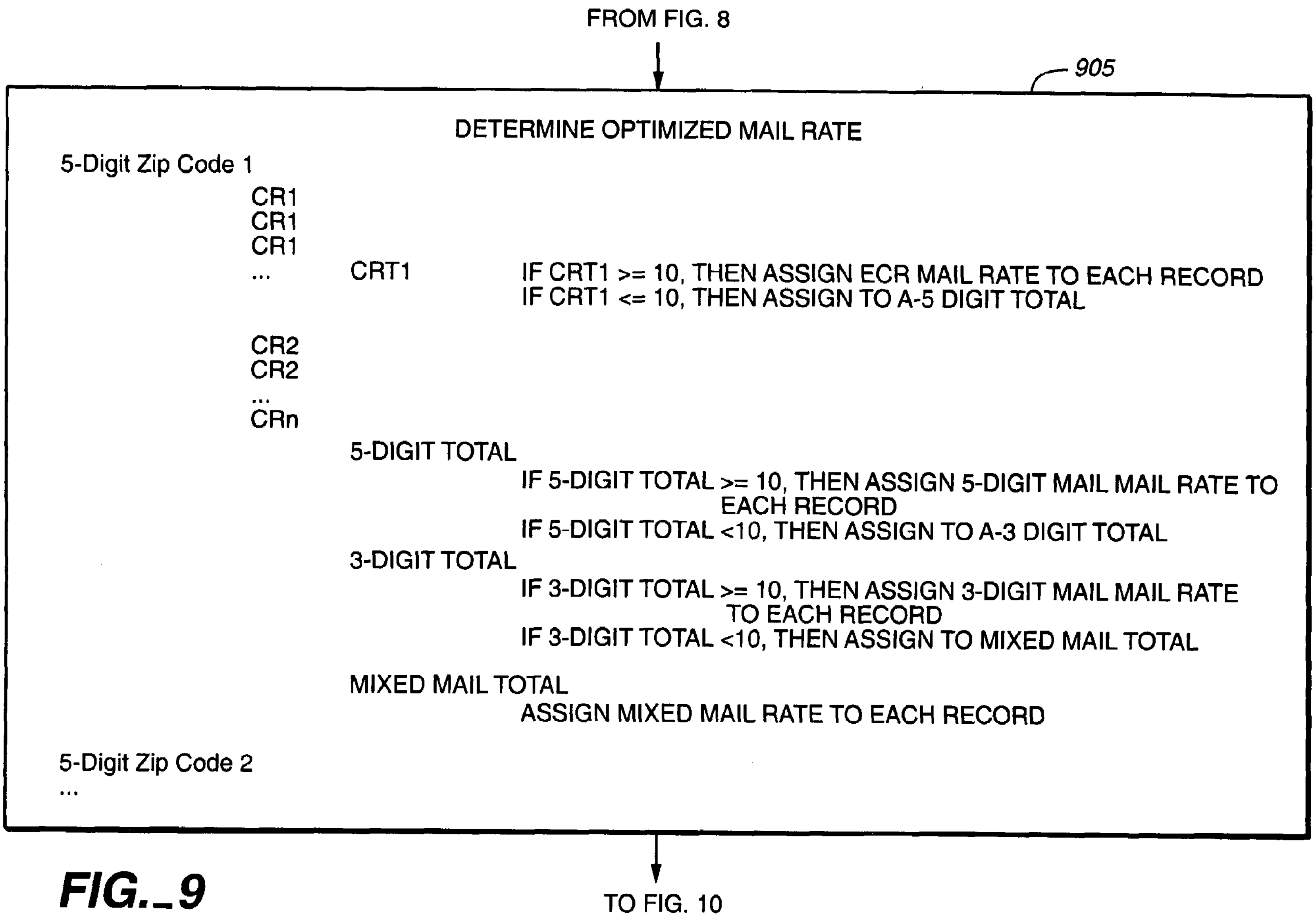
FIG. 9 is a flow diagram of an embodiment of the method of the present invention.

FIG. 9 is a flow chart of an embodiment of the method for co-mailing a plurality of publications of the present invention. In FIG. 9, an optimized mail rate field is calculated to add to the merged verified sequence list 805 of FIG. 8 to create an optimized merged verified sequence list (FIG. 10). The mail rate is optimized by following the procedure depicted in FIG. 9. It is understood, however, that the procedure for optimizing the mail rate of FIG. 9 is a function of standard USPS postage rates that determine the minimum number of publications to a common carrier route, 5-digit zip code or 3-digit zip code. Should the minimum number of publications necessary to achieve a discounted postage rate change, it is understood that the procedure for determining the optimized mail rate would correspondingly change, yet the scope of the present invention as claimed below will remain the same. In FIG. 9, the merged verified sequence list 805 will be optimized by determining the mail rate for each of the records using the procedure of 905. In the procedure of 905, all the records in a first group of 5-digit zip codes are categorized. Within the first group of 5-digit zip codes, a carrier route total number (CRT1) is determined by adding all the same carrier routes (e.g. CR1) within a 5-digit zip code. Once all the same carrier routes are totaled, a carrier route total number is determined, and a carrier route mail rate is applied when the CRT1 is greater than a carrier route predetermined minimum (e.g. in one embodiment, the post office provides a discount rate when the carrier route predetermined minimum is 10 or more publications to the same carrier route). However, in alternative embodiments, the carrier route predetermined minimum may change and is generally determined by standard postal discounts rates that may change over time. After the CRT1 is determined, a similar process is applied to determine a five digit zip code total number and a three digit zip code total numbers where these totals are compared to a five digit zip code predetermined minimum and a three digit zip code predetermined minimum, respectively, to determine whether the predetermined minimum is met and a post office discount rate may be applied. Thus, with regard to the five digit zip code total, in one embodiment, the five digit zip code total is determined by adding all the publications within the five digit zip code that do not qualify for the carrier route rate. If the five digit zip code total is greater than or equal to ten (as required by current postal discount rates, but which may change over time), a five digit zip code rate is applied. Likewise, with regard to the three digit zip code total, in one embodiment, the three digit zip code total number are in a second group and is determined by adding all the publications with the same three digit zip code (e.g. the first three digits of the zip code are the same), that do not qualify for the same carrier route or five digit zip code rate. If the number of publications with the same three digit zip code is greater than or equal to 10 (as required by current postal discount rates, but which may change over time), then a three digit zip code mail rate is applied. If the publication does not fall within the carrier route total number, the five digit zip code total number or the three digit zip code total number, then a third group of standard mixed mail rate is applied to the plurality of diverse publications, which is the full postage rate with no volume discount.

FIG. 10 is a flow diagram of an embodiment of the method of the present invention. In FIG. 10, the mail rate (MR) field has been added to the merged verified sequence list 805 (FIG. 8) to create the optimized merged verified sequence list 1005. The MR field has been determined using the procedure of FIG. 9. In FIG. 10, the MR is either an ECR, 5D (five digit zip code rate) or 3D (three digit zip code rate) as was determined from FIG. 9. This MR field is used by the co-mailer to place the OEL on each publication that is sent through the co-mailer. The MR is determined after all the verified sequence lists have been merged into the merged verified sequence list 805 (FIG. 8) which provides a significant benefit. This benefit is the volume discount that may now be determined. That is, now that the many verified sequence lists have been merged, the MR may be determined taken advantage of large volume discounts. This is unlike the past where the mail rate, in bindery and presort systems, determined the mail rate only for one publication without combining multiple publications; and in co-mailer and presort systems, where larger volumes were realized, but without any customization. Here, both customization and large volume discounts are achieved.

Figure 11:
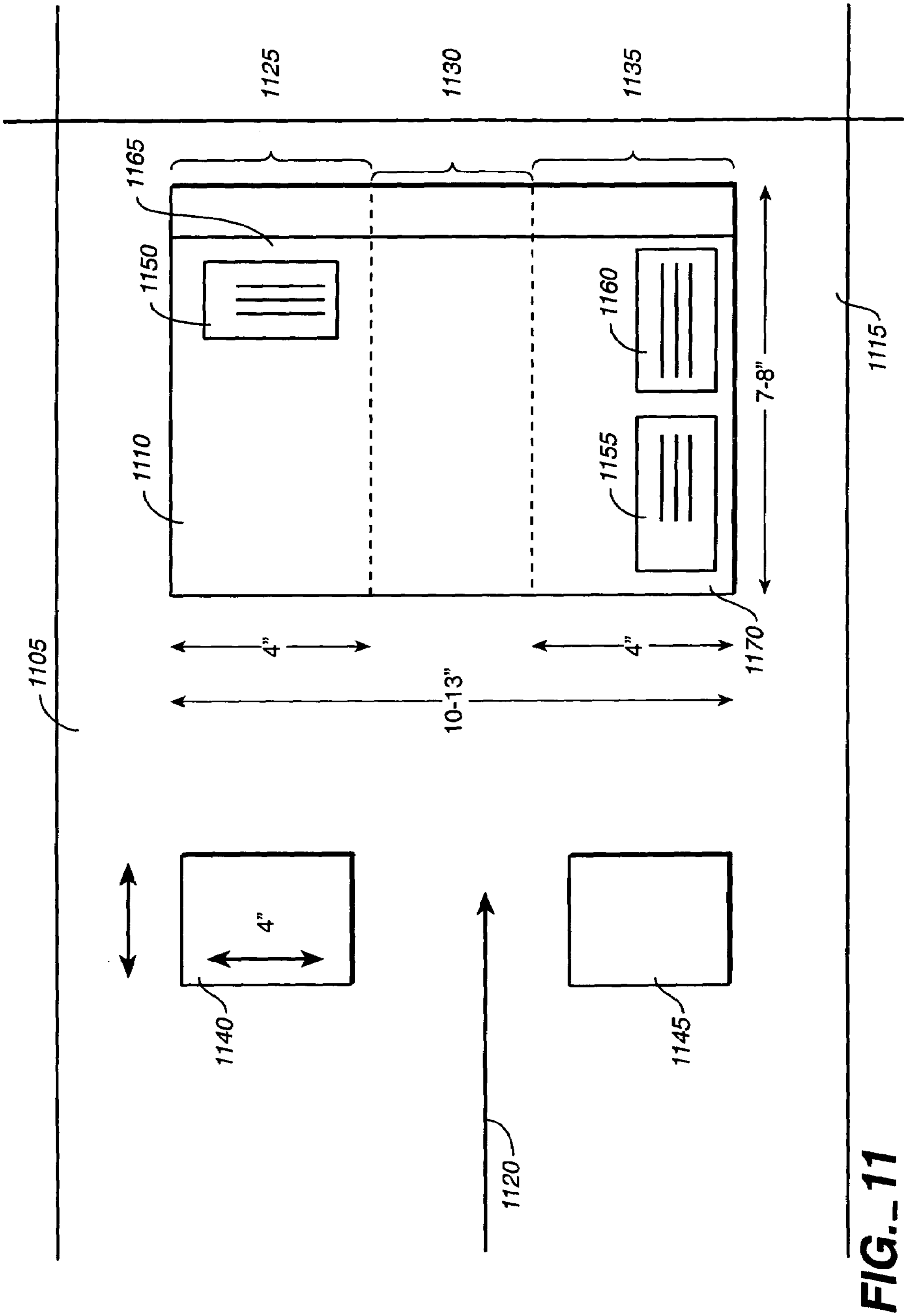
FIG. 11 is a top view of an embodiment of the print head of the present invention.

FIG. 11 is a top view of an embodiment of the print head of the present invention. In FIG. 11, a publication 1110 is being transported by a conveyer 1105 as part of a merge stream in a co-mailer. The publication flow direction 1120 shows the direction in which the publication 1110 is moving. The size of the publication is shown, in this embodiment, to be in the range of 10–13 inches by 7–8 inches. The publication 1110 has been divided into three portions, a top portion 1125, a middle portion 1130 and a bottom portion 1135. A first print head 1140 is able to print the mail rate (e.g. on an optional endorsement line (OEL)) or other identifier information 1150, such a name, street, city, etc., in the first portion 1125, while a second print head 1145 is able to print the identifier information 1155, 1160 on the bottom portion 1135. It is noted that the first 1140 and second 1145 print heads may print the identifier information 1150, 1155, 1160 in different placement positions and orientations. That is, 1150 is placed at the far end 1165 of the first portion 1125, while identifier information 1155 may be placed at the near end 1170 of the bottom portion 1135. Also, the orientation of the identifier information 1150 is perpendicular to the publication flow direction 1120, while the identifier information 1155, 1160 are parallel to the publication flow direction 1120. This placement and orientation of the identifier information is a benefit to the present system since publishers that design the publication 1110 have varying requirements of where the identifier information should be placed. With the first 1140 and second 1145 print heads, the placement and orientation of the identifier information may be customized to the publisher's requirements. A third print head may be included in another embodiment to allow printing across the entire publication (i.e. the middle portion 1130), but generally most publisher's prefer to keep the middle portion 1130 clear of OEL or other identifier information.

FIG. 12 is a plan view of an embodiment of the co-mailer of the present invention. In FIG. 12, one embodiment of the co-mailer of the system of the present invention is shown. It is understood that while certain dimensions, materials and other embodiments of the co-mailer of the present invention are provided, the co-mailer shown and described in FIG. 12 is only one embodiment of the co-mailer of the present invention as claimed below. In one embodiment, the co-mailer is the co-mailer 325 of FIG. 3 that receives the plurality of publications, for example, first publication A 340 and second publication B 341, both of FIG. 3. The plurality of diverse publications are received by the co-mailer at the pockets 1210 of plurality of pockets, in one embodiment up to 30 pockets, where each pocket 1210 contains the plurality of publications, such as publication A 340 of FIG. 3. That is, each pocket 1210 contains only one publication, yet up to 30 different diverse publications may exist on each of the separate pockets 1210, in another embodiment. The pockets 1210 may be any well-known pockets in the art, including, for example, the SF500 Book Feeder manufactured by Simproducts of Shumway, Ill., incorporated herein by reference. Each of the pockets 1210 receives each of the plurality of diverse publications to send the diverse publications to a merge stream 1215. The merge stream 1215 is any type of conveyer that is able to transport the plurality of diverse publications from the pockets 1210 to the print table 1220. In one embodiment, the merge stream is a chain conveyer belt that transports the plurality of diverse publications to the print table 1220. The print table 1220 contains the first print head and second print head (FIG. 11) and is used to print the mail rate (OEL) on each of the plurality of diverse publications coming to the print table 1220 from the pockets 1210. Again, it is noted that all the pockets 1210 are identical and, in one embodiment, can have up to 30 pockets on the co-mailer, each pocket containing one of a plurality of diverse publications. It is further noted that FIG. 12 contains approximate dimensions of the co-mailer in units of feet and inches. However, it is understood that these dimensions are only one embodiment and that alternative embodiments may be of different dimensions yet fall within the scope of the present invention as claimed below.

Still in FIG. 12, the print table 1220 uses the first and second print heads (not shown) to print the mail rate on each of the plurality of diverse publications coming along the mail stream 1215 to the print table 1220 and may, in another embodiment, print the entire identifier information (e.g. recipient name, street number, street, city, state, zip code, Customer Information number, OEL, etc.). Connected to the print table 1220 is a sortation device 1221 that contains a plurality of sortation lanes 1225, 1230, 1235, 1240, 1245. The plurality of sortation lanes is a part of the sortation device that is coupled and in communication with the co-mailer. It is understood that the sortation device 1221 need not be connected to the co-mailer print table, yet may still function in a manner to sort each of the plurality of diverse publications from the co-mailer at the optimized mail rate. Sortation device 1221 takes the plurality of diverse publications that have gone through the print table 1220 and sorts each of the plurality of diverse publications by the mail rate (OEL). That is, each of the plurality of sort lanes 1225, 1230, 1235, 1240, 1245 may be dedicated to a particular mail rate category (e.g. enhanced carrier route, five digit zip code, three digit zip code, mixed mail). It is understood that while only a limited number of sortation lanes are shown in the embodiment of FIG. 12, the sortation device 1221 may contain more or less number of sortation lanes, depending on the mail rate categories used. In the embodiment of FIG. 12, the sortation lane 1225 is used to remove any damaged publications of the plurality of diverse publication. The sortation lane 1230 may be used for enhanced carrier route publications. Each of the plurality of diverse publications with an enhance carrier route mail rate is therefore diverted through sortation lane 1230, up to a stacker 1250 and then to a bundler 1255. Thus, as each of the plurality of diverse publications is accumulated at the stacker 1250, the packets of diverse publications are bundled at 1255 in a predetermined number of publications per bundle. Likewise, sortation lane 1235 can be used to divert each of the plurality of diverse publications that contain a five-digit zip code mail rate and sort lane 1240 is used to divert each of the plurality of diverse publications that contain a three-digit zip code mail rate. Again, sortation lanes 1230, 1235 and 1240 all contain the stacker and bundler as described in sortation lane 1230. Lastly, the embodiment of FIG. 12 has a mixed mail sortation lane 1245 that stacks and wraps publications that have been placed in that category by the optimized merge verified sequence list of FIG. 10. Also, replacements for the publications damaged in handling while on the co-mailer may be sent through soratation lane 1245.

In use, the optimized merge verified sequence list (FIG. 10) is sent to a co-mail merge and sequence module 330 (FIG. 3) that is in turn sent to a co-mailer control module 335 (FIG. 3). These two modules 330, 335 may be contained on the co-mailer or may be in communication with the co-mailer. In one embodiment, the optimized merge verified sequence list is in software format and is in communication with the co-mailer of FIG. 12. The co-mailer control module 335 (FIG. 3) controls all the aspects of the co-mailer of FIG. 12 in one embodiment. Thus, the co-mailer control module 335 receives the optimized merged verified sequence list of FIG. 10 and is able to control the pockets 1210 that each contains a plurality of publications. Since the optimized merge verified sequence list is in a unique order that is maintained from the bindery system 300 (FIG. 3) where the physical publications at each pocket are in the same unique order, the co-mailer control module 335 is able to control which pocket, and therefore which publication, is sent on to the merge stream 1215 at the correct instant. In other words, the unique order in which the plurality of publications were bound at the bindery 300 (FIG. 3) is maintained from the bindery to the co-mailer of FIG. 12. Thus, with the unique order maintained, the co-mailer control module 335 is able to know exactly which publication at a particular pocket 1210 is next on the optimized merge verified sequence list of FIG. 10. By knowing this, the co-mailer control module 335 instructs the pocket 1210 to send the publication on to the merge stream 1215 so that the proper mail rate (OEL) is placed on that publication at the print table 1220. Once the print table places the correct mail rate on each publication, the co-mail control module 335 (FIG. 3) uses the mail rate field in the optimized merge verified sequence list (FIG. 10) to determine which sortation lane that particular publication belongs in depending on the assigned mail rate. Also, in case the publication is damaged along the merge stream 1215, the sortation lane 1225 may be used for damaged publications. It is also noted that the verification device 327 (FIG. 3) may be located along the merge stream 1215 in the embodiment of FIG. 12 in order to verify that each publication is in the appropriate position to receive the appropriate mail rate at the print table 1220. Again, the verification device may be any of the verification devices described herein with regard to the bindery verification device of FIG. 3.

Figure 13:
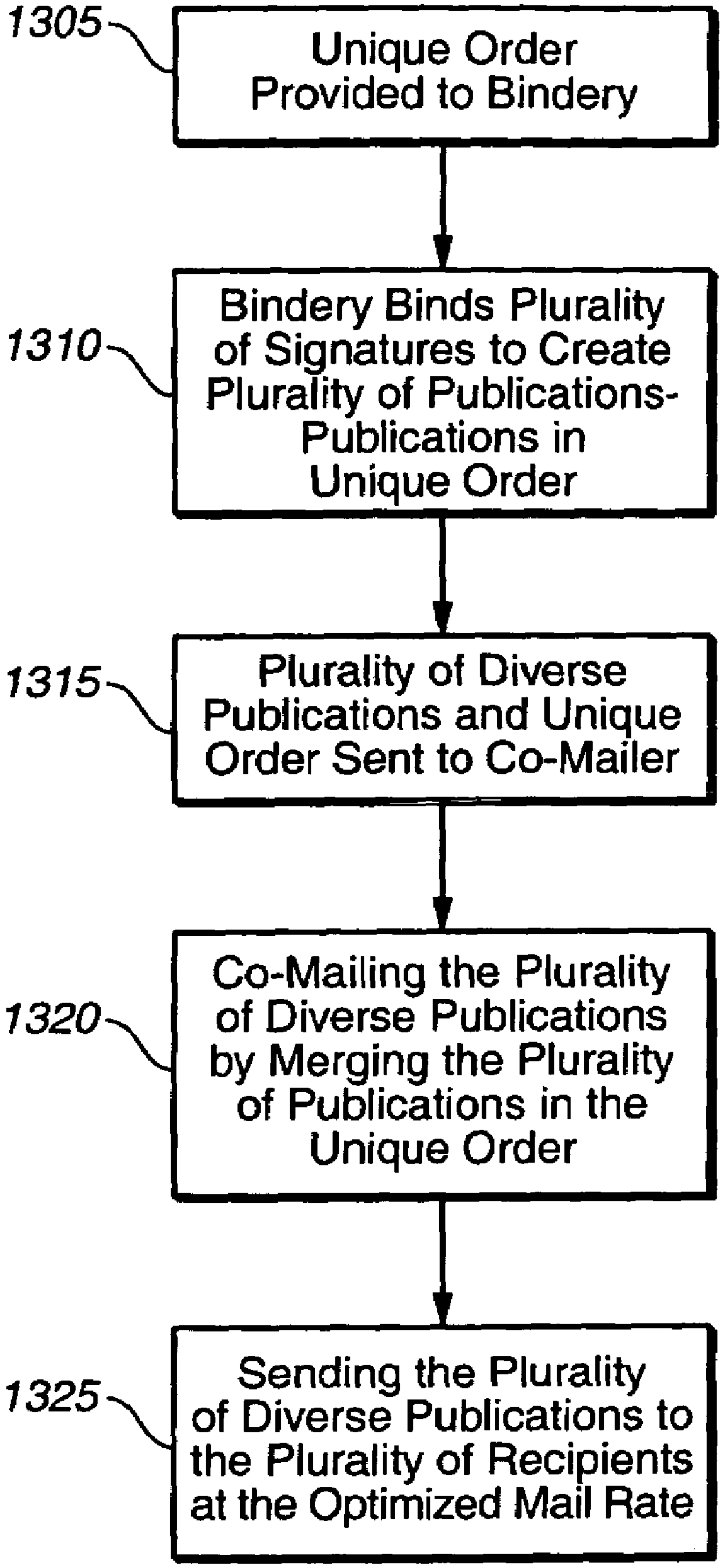
FIG. 13 is a flow chart of an embodiment of the method of the present invention.

FIG. 13 is a flow chart of an embodiment of the method of the present invention. In FIG. 13, the method first provides a unique order to a bindery (1305), the unique order defining an order that each of the plurality of publications are bound by the bindery. Then binding (1310), by the bindery, a plurality of the signatures to create the plurality of publications, where each of the plurality of publications is in the unique order. The plurality of diverse publications are then sent to the co-mailer (1315). Then, co-mailing the plurality of diverse publications by merging the plurality of diverse publications in the unique order (1320) to send the plurality of diverse publications to the plurality of recipients at the optimized mail rate (1325).

Figure 14:
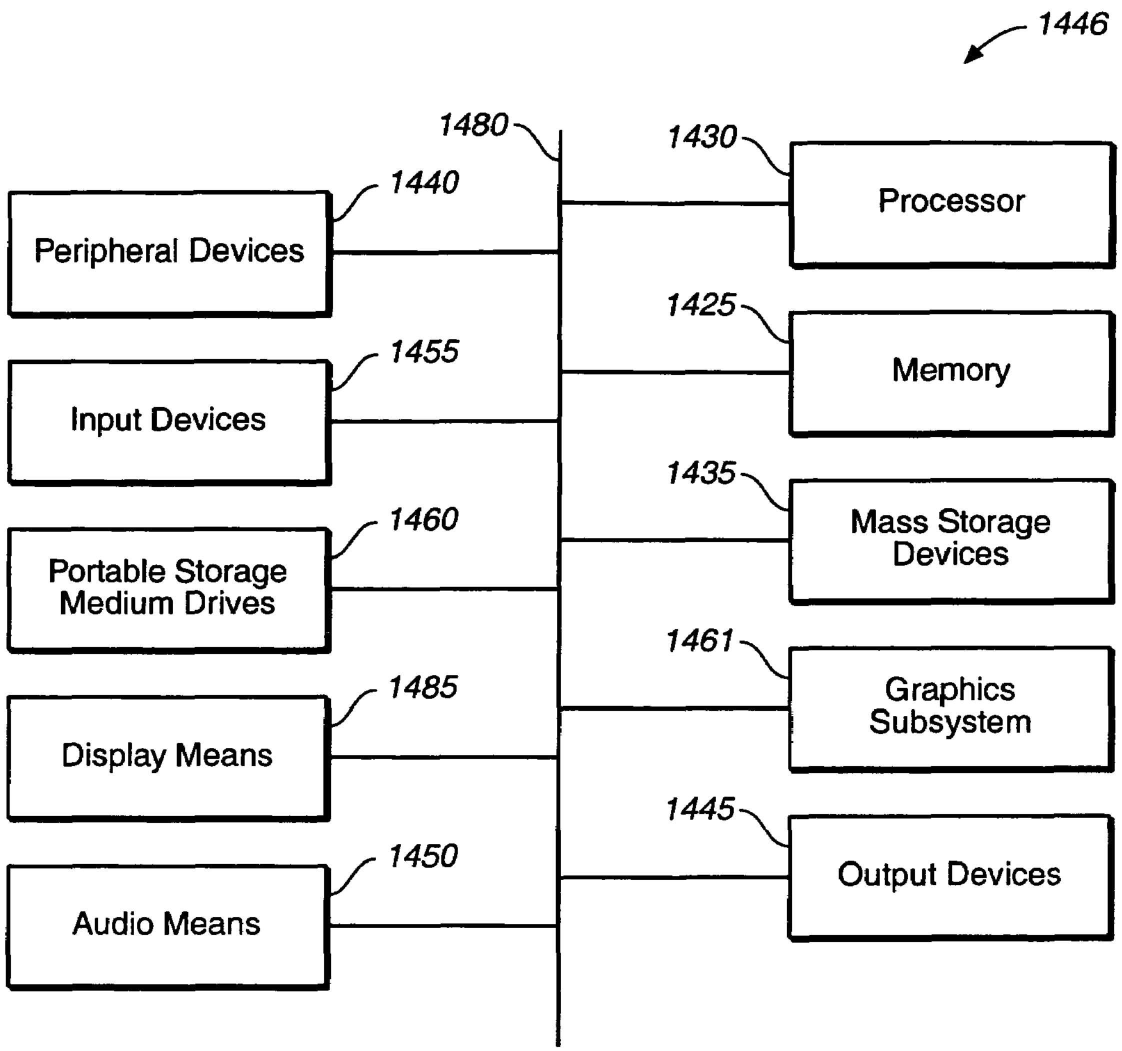
FIG. 14 is a high level block diagram view of a computer system implementing embodiments of the method of the present invention.

FIG. 14 illustrates a high-level block diagram of a general purpose computer which is used in one embodiment, to implement the method and system of the present invention. The general purpose computer 1446 of FIG. 14 includes a processor 1430 and memory 1425. Processor 1430 may contain a single microprocessor, or may contain a plurality of microprocessors, for configuring the computer system as a multi-processor system. Memory 1425, stores, in part, instructions and data for execution by processor 1430. If the system of the present invention is wholly or partially implemented in software, including computer instructions, memory 1425 stores the executable code when in operation. Memory 1425 may include banks of dynamic random access memory (DRAM) as well as high speed cache memory.

The computer of FIG. 14 further includes a mass storage device 1435, peripheral device(s) 1440, audio means 1450, input device(s) 1455, portable storage medium drive(s) 1460, a graphics subsystem 1461 and a display means 1485. For purposes of simplicity, the components shown in FIG. 14 are depicted as being connected via a single bus 1480 (i.e. transmitting means). However, the components may be connected through one or more data transport means (e.g. Internet, Intranet, etc.). For example, processor 1430 and memory 1425 may be connected via a local microprocessor bus, and the mass storage device 1435, peripheral device(s) 1440, portable storage medium drive(s) 1460, and graphics subsystem 1461 may be connected via one or more input/output (I/O) buses. Mass storage device 1435, which is typically implemented with a magnetic disk drive or an optical disk drive, is in one embodiment, a non-volatile storage device for storing data and instructions for use by processor 1430. The mass storage device 1435 includes the storage medium of embodiments of the present invention, and the server storage medium and client storage medium in alternative embodiments. The computer instructions that implement the method of the present invention also may be stored in processor 1430.

Portable storage medium drive 1460 operates in conjunction with a portable non-volatile storage medium, such as a floppy disk, or other computer-readable medium, to input and output data and code to and from the computer system of FIG. 14. In one embodiment, the method of the present invention that is implemented using computer instructions is stored on such a portable medium, and is input to the computer system 1446 via the portable storage medium drive 1460. Peripheral device(s) 1440 may include any type of computer support device, such as an input/output (I/O) interface, to add additional functionality to the computer system 1446. For example, peripheral device(s) 1440 may include a network interface card for interfacing computer system 1446 to a network, a modem, and the like.

Input device(s) 1455 provide a portion of a user interface. Input device(s) 1455 may include an alpha-numeric keypad for inputting alpha-numeric and other key information, or a pointing device, such as a mouse, a trackball, stylus or cursor direction keys. In order to display textual and graphical information, the computer 1446 of FIG. 14 includes graphics subsystem 1461 and display means 1485. Display means 1485 may include a cathode ray tube (CRT) display, liquid crystal display (LCD), other suitable display devices, or means for displaying, that enables a user to view the customized media list or customized media. Graphics subsystem 1461 receives textual and graphical information and processes the information for output to display 1485. The display means 1485 provides a practical application for providing the customized media list of the present invention since the method of the present invention may be directly and practically implemented through the use of the display means 1485. The computer system 1446 of FIG. 14 also includes an audio system 1450. In one embodiment, audio means 1450 includes a sound card that receives audio signals from a microphone that may be found in peripherals 1440. In another embodiment, the audio system 1450 may be a processor, such as processor 1430, that processes sound. Additionally, the computer of FIG. 14 includes output devices 1445. Examples of suitable output devices include speakers, printers, and the like.

The devices contained in the computer system of FIG. 14 are those typically found in general purpose computer, and are intended to represent a broad category of such computer components that are well known in the art. The system of FIG. 14 illustrates one platform which can be used for practically implementing the method of the present invention. Numerous other platforms can also suffice, such as Macintosh-based platforms available from Apple Computer, Inc., platforms with different bus configurations, networked platforms, multi-processor platforms, other personal computers, workstations, mainframes, navigation systems, and the like.

In a further embodiment, the present invention also includes a computer program product which is a computer readable medium (media) having computer instructions stored thereon/in which can be used to program a computer to perform the method of the present invention as shown in FIG. 13. The storage medium can include, but is not limited to, any type of disk including floppy disks, optical disks, DVD, CD ROMs, magnetic optical disks, RAMs, EPROM, EEPROM, magnetic or optical cards, or any type of media suitable for storing electronic instructions.

These same computer instructions may be located in an electronic signal that is transmitted over a data network that performs the method as shown in FIG. 13 when loaded into a computer. The computer instructions are in the form of data being transmitted over a data network. In one embodiment, the method of the present invention is implemented in computer instructions and those computer instructions are transmitted in an electronic signal through cable, satellite or other transmitting means for transmitting the computer instructions in the electronic signals.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems and user applications. Ultimately, such computer readable media further includes software for performing the method of the present invention as described above.

Although the present invention has been described in detail with respect to certain embodiments and examples, variations and modifications exist which are within the scope of the present invention as defined in the following claims.

What is claimed is:

1. A system for combined mailing (co-mailing) of a plurality of diverse publications to a plurality of recipients, comprising:

a bindery, the bindery creating a plurality of first publications and a plurality of second publications, each of the plurality of first publications identified with one of the plurality of recipients on a first list, each of the plurality of second publications identified with one of the plurality of recipients on a second list; and a co-mailer, the co-mailer combining the plurality of first publications with the plurality of second publications to form the plurality of diverse publications, the co-mailer comprising:

a co-mailer merge and sequence module that merges the first list and the second list to create a merged list, the merged list being used to determine a mail rate for each of the plurality of first publications and each of the plurality of second publications;

a co-mailer control module that communicates with the co-mailer merge and sequence module to merge each of the plurality of first publications and each of the plurality of second publications on a merge stream and into the plurality of diverse publications based on the merged list;

a printing device that receives the plurality of diverse publications merged and places the mail rate on each of the plurality of diverse publications; and a sortation device that receives the plurality of diverse publications from the merge stream and sorts each of the plurality of diverse publications by the mail rate.

2. The system of claim 1, wherein the bindery comprises:

a bindery sequence list module, the bindery sequence list module receiving a record list containing a plurality of records and sequencing one or more of the plurality of records into a sequence list.

3. The system of claim 2, wherein the bindery comprises:

a bindery verification device, the bindery verification device being in communication with the bindery sequence module to verify the sequence list into a verified sequence list, the verified sequence list for the plurality of first publications being the first list, the verified sequence list for the plurality of second publications being the second list.

4. The system of claim 1, the bindery further comprising:

a thickness measurement device for determining a thickness of each of the plurality of publications; and a weight measurement device for determining a weight of each of the plurality of publications, wherein the thickness and the weight of each of the plurality of publications is communicated to the co-mailer.

5. The system of claim 1, wherein the bindery binds the plurality of first publications and a second bindery binds the plurality of second publications.

6. The system of claim 1, wherein the plurality of diverse publications comprises magazines, catalogs, books, bound letters or periodicals.

7. The system of claim 1, further comprising:

a bindery bundling device for stacking, wrapping and labeling the plurality of first publications and the plurality of second publications to be transferred to the co-mailer.

8. The system of claim 1, wherein the co-mailer further comprises:

a co-mailer control module in communication with the co-mailer merge and sequence module, the co-mailer control module controlling the co-mailer to merge each of the plurality of first publications and each of the plurality of second publications in an order listed in the merged list.

9. The system of claim 1, wherein the co-mailer further comprises:

a co-mailer control module in communication with the co-mailer merge and sequence module, the co-mailer control module controlling the merge stream, printing device and sortation device to mail the plurality of diverse publications to the plurality of recipients.

10. The system of claim 1, wherein the co-mailer further comprises:

a co-mailer verification device in communication with the co-mailer control module, the co-mailer verification device located at a number of locations relative to the merge stream to verify an order that each of the plurality of diverse publications have been merged.

11. The system of claim 1, wherein the printing device is located between the merge stream and a stacking device.

12. The system of claim 1, wherein the printing device is located after the merge stream and after the sortation device.

13. The system of claim 1, further comprising:

a bundling device for stacking, labeling and wrapping the plurality of diverse publications, the bundling device being coupled to and in communication with the co-mailer.

14. A system for co-mailing a plurality of diverse publications to a plurality of recipients, comprising:

a co-mailer comprising:

a co-mailer merge and sequence module that merges the first list and the second list to create a merged list, the merged list being used to determine a mail rate for each of the plurality of first publications and each of the plurality of second publications;

a co-mailer control module that communicates with the co-mailer merge and sequence module to merge each of the plurality of first publications and each of the plurality of second publications on a merge stream and into the plurality of diverse publications based on the merged list;

a printing device that receives the plurality of diverse publications merged and places the mail rate on each of the plurality of diverse publications; and a sortation device that receives the plurality of diverse publications from the merge stream and sorts each of the plurality of diverse publications by the mail rate.

15. A method for co-mailing of a plurality of diverse publications to a plurality of recipients, comprising:

binding a plurality of signatures to create a plurality of first publications and a plurality of second publications, each of the plurality of first publications identified with one of the plurality of recipients on a first list, each of the plurality of second publications identified with one of the plurality of recipients on a second list;

transferring the first list and the second list to a co-mailer;

determining, by the co-mailer, a mail rate for each of the plurality of first publications and each of the plurality of second publications by merging the first list and the second list to form a merged list;

merging each of the plurality of first publications and each of the plurality of second publications in the order of the merged list to form the plurality of diverse publications;

printing, by a printing device in communication with the co-mailer, the mail rate on each of the plurality of diverse publications merged; and sorting the plurality of diverse publications by the mail rate to mail the plurality of diverse publications to the plurality of recipients.

16. The method of claim 15, wherein the binding step further comprises:

bindery printing, at the bindery, an identifier information on one or more of the plurality of signatures to customize one or more of the plurality of first publications and one or more of the plurality of second publications with one or more of the plurality of recipients.

17. The method of claim 15, wherein the binding step further comprises:

providing the list to a bindery sequence list module in communication with the bindery, the list containing the identifier information for each of the plurality of recipients; and sequencing the list in a predetermined sequence to obtain a sequence list used to determine the mail rate.

18. A method for co-mailing of a plurality of diverse publications to a plurality of recipients, comprising:

co-mailing the plurality of diverse publications by merging each of the plurality of diverse publications in an order, the order identifying each of the plurality of first publications and each of the plurality of second publications with each of the plurality of recipients;

printing a mail rate on each of the plurality of diverse publications merged; and sorting each of the plurality of diverse publications from the co-mailer by the mail rate to deliver each of the plurality of diverse publications to the plurality of recipients at the mail rate.

19. A computer readable medium having computer instructions stored thereon that, when loaded into a computer system, cause the computer system to perform a method for co-mailing of a plurality of diverse publications to a plurality of recipients, the method comprising:

binding a plurality of signatures to create a plurality of first publications and a plurality of second publications, each of the plurality of first publications identified with one of the plurality of recipients on a first list, each of the plurality of second publications identified with one of the plurality of recipients on a second list;

transferring the first list and the second list to a co-mailer;

determining, by the co-mailer, a mail rate for each of the plurality of first publications and each of the plurality of second publications by merging the first list and the second list to form a merged list;

merging each of the plurality of first publications and each of the plurality of second publications in the order of the merged list to form the plurality of diverse publications;

printing, by a printing device in communication with the co-mailer, the mail rate on each of the plurality of diverse publications merged; and sorting the plurality of diverse publications by the mail rate to mail the plurality of diverse publications to the plurality of recipients.

* * * * *